United States Patent
Yamashita

(10) Patent No.: US 6,756,759 B2
(45) Date of Patent: Jun. 29, 2004

(54) ANGLE OR POSITION DETECTING APPARATUS, METHOD THEREOF, SERVO APPARATUS, AND SERVO METHOD, AND MOTOR

(75) Inventor: Noriyuki Yamashita, Tokyo (JP)

(73) Assignee: Sony Corporation, Tokyo (JP)

(*) Notice: Subject to any disclaimer, the term of this patent is extended or adjusted under 35 U.S.C. 154(b) by 89 days.

(21) Appl. No.: 10/190,131

(22) Filed: Jul. 3, 2002

(65) Prior Publication Data

US 2003/0088382 A1 May 8, 2003

Related U.S. Application Data

(63) Continuation of application No. PCT/JP01/09623, filed on Nov. 2, 2001.

(30) Foreign Application Priority Data

Nov. 6, 2000 (JP) .................................... P2000-337309

(51) Int. Cl.[7] .......................................... G05B 11/01
(52) U.S. Cl. ....................... 318/560; 318/602; 318/603; 318/605; 318/661; 318/254; 318/439; 318/138; 340/870.03; 340/870.18; 340/870.19; 340/870.31; 324/207.11; 324/207.13; 324/207.15; 324/207.23; 324/207.24; 324/207.25
(58) Field of Search ................................ 318/602, 603, 318/605, 661, 560, 254, 439, 138; 340/870.18, 870.19, 870.03, 870.31; 324/207.11, 207.13, 207.15, 207.23, 207.24, 207.25

(56) References Cited

U.S. PATENT DOCUMENTS

| | | | | |
|---|---|---|---|---|
| 4,779,075 A | * | 10/1988 | Zagelein et al. | 340/870.18 |
| 4,855,734 A | * | 8/1989 | Elsdoerfer | 340/870.31 |
| 5,124,625 A | * | 6/1992 | Wakabayashi | 318/603 |
| 5,254,919 A | * | 10/1993 | Bridges et al. | 318/560 |
| 6,243,023 B1 | * | 6/2001 | Katagiri | 340/870.03 |

FOREIGN PATENT DOCUMENTS

| | | |
|---|---|---|
| JP | 2-189416 | 7/1990 |
| JP | 5-158544 | 6/1993 |
| JP | 8-242564 | 9/1996 |

* cited by examiner

Primary Examiner—Rina Duda
(74) Attorney, Agent, or Firm—Reed Smith LLP

(57) ABSTRACT

A current target angle stored in a target angle register is subtracted from the immediately preceding target angle stored in a register by a subtracting device. As a result, the length (amount) and direction between the immediately preceding target angle to the current angle are generated. With the generated length and direction, a model acceleration generating circuit generates model acceleration data. With a count value of a current velocity detecting counter and a velocity data sequence that is output from a model velocity generating circuit, velocity error data is generated. With a count value of a current position detecting counter and a position data sequence that is output from a model position generating circuit, position error data is generated. The model acceleration data, the velocity error data, and the position error data are added by an adding device. The added result is supplied to a driver. The driver outputs a current that drives a pan motor.

16 Claims, 50 Drawing Sheets

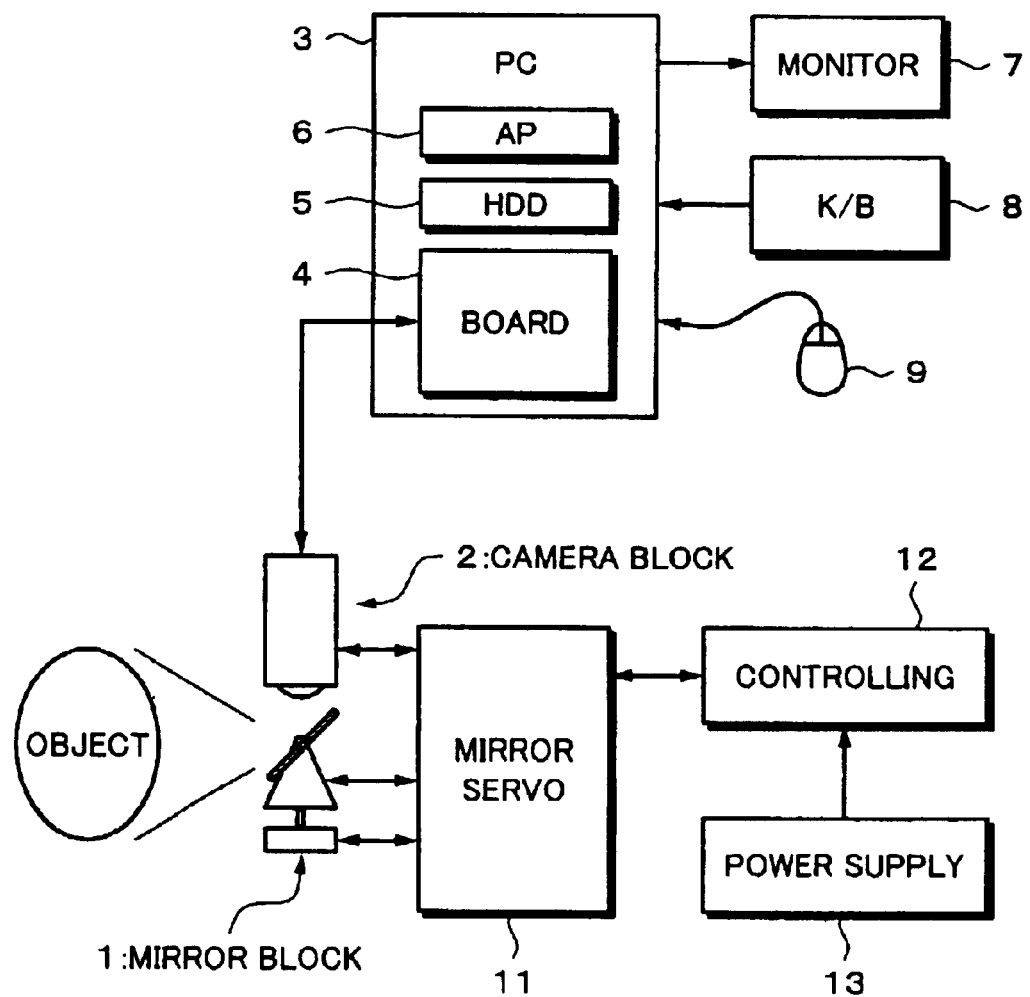

Fig. 8

|  | 30 ms | 50 ms | 100 ms | 300 ms | 1 s |
|---|---|---|---|---|---|
| NORMAL MODE | 1.68 DEG | 2.8 DEG | 5.6 DEG | 16.8 DEG | 56 DEG |
| KICK MODE | 4.5 DEG | 12.5 DEG | 50 DEG | (450) DEG | (5000) DEG |

Fig. 56
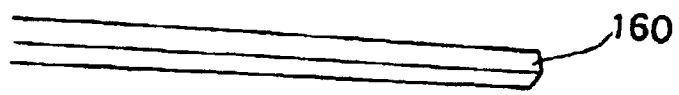
Fig. 57
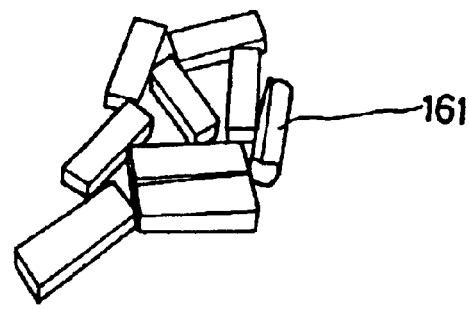
Fig. 58
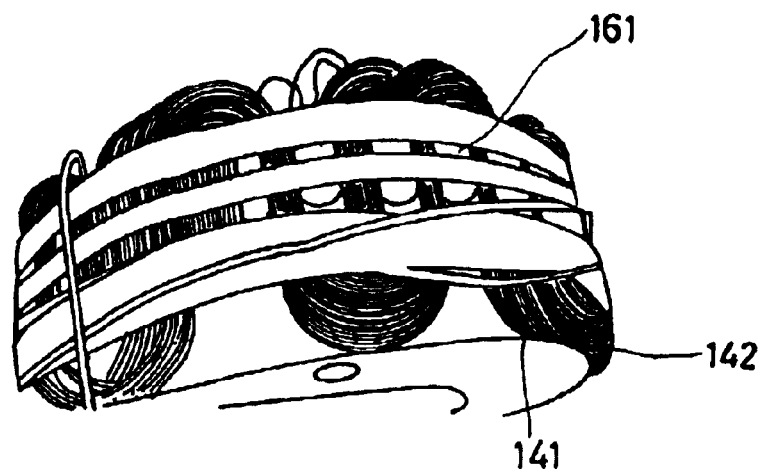

ANGLE OR POSITION DETECTING APPARATUS, METHOD THEREOF, SERVO APPARATUS, AND SERVO METHOD, AND MOTOR

CROSS-REFERENCE TO RELATED APPLICATION

This a continuation International Application PCT/JP01/09623, with an international filing date Nov. 2, 2001, which was not published under English under PCT Article 21(2).

TECHNICAL FIELD

The present invention relates to an angle or position detecting apparatus, a method thereof, a servo apparatus, a servo method, and a motor that allow a substance having mass to be moved to a target position or a target angle in the shortest time.

BACKGROUND ART

Conventionally, when a substance having mass is moved for a predetermined distance in the shortest time, the substance is maximally accelerated for the half distance and then maximally decelerated for the rest of the distance. When a substance having mass is rotated, the same method is used. At that point, mass, distance, velocity, acceleration, and target position are substituted with inertia, angle, angular velocity, angular acceleration, and target angle, respectively.

However, in this method, the rotation of the substance is largely affected by the fluctuation of the load or various parameters. Thus, it is very difficult to stop the substance at a target position or a target angle with velocity "0".

When an MR sensor that outputs one wave length of a sine wave or a cosine wave corresponding to one degree of a rotating angle is used, the MR sensor can detect an angle in the step of ¼ degree.

In addition, most motors are of magnet rotating type.

However, in the case of magnet rotating type motors, when the magnetic field generated by the magnetic circuit is strengthen, the mass (inertia) of the rotating portion of the motor becomes heavy. Thus, although the torque of the motor becomes large, a substance cannot be moved at high speed.

Therefore, an object of the present invention is to provide an angle or position detecting apparatus, a method thereof, a servo apparatus, a servo method, and a motor that allow a substance having mass to be moved to a target position or a target angle in the shortest time.

DISCLOSURE OF THE INVENTION

The present invention is an angle or position detecting apparatus, comprising an actuator composed of a coil and a magnet, a mechanism for performing a rotating operation or a reciprocal operation, a sensor for detecting the angle or position of the actuator and outputting a first sine wave and a second sine wave that are shifted by 90 degrees each other, a counter for storing the current angle or the current position, a memory for outputting a third sine wave and a fourth sine wave that are shifted by 90 degrees each other corresponding to an output of the counter, a first multiplying device for multiplying the first sine wave by the third sine wave, a second multiplying device for multiplying the second sine wave by the fourth sine wave, a subtracting device for subtracting a signal that is output from the first multiplying device from a signal that is output from the second multiplying device, and an operation amplifying means for amplifying a signal that is output from the subtracting device, wherein the current angle or the current position of the counter is increased or decreased corresponding to an output of the operational amplifying means and the increased or decreased angle or position is output as the current angle or current position.

The present invention is an angle or position detecting method, comprising the steps of causing an actuator composed of a coil and a magnet to perform a rotating operation or a reciprocal operation, detecting the angle or position of the actuator and outputting a first sine wave and a second sine wave that are shifted by 90 degrees each other, storing the current angle or the current position, outputting a third sine wave and a fourth sine wave that are shifted by 90 degrees each other corresponding to the current angle or the current position that has been stored, causing a first multiplying device to multiply the first sine wave by the third sine wave, causing a second multiplying device to multiply the second sine wave by the fourth sine wave, causing a subtracting device to subtract a signal that is output from the first multiplying device from a signal that is output from the second multiplying device, causing an operation amplifying means to amplify a signal that is output from the subtracting device, and increasing or decreasing the current angle or the current position corresponding to an output of the operational amplifying means and outputting the increased or decreased angle or position as the current angle or current position.

The present invention is a servo apparatus, comprising an actuator composed of a coil and a magnet, a mechanism for performing a rotating operation or a reciprocal operation, a sensor for detecting the angle or position of the actuator and outputting a first sine wave and a second sine wave that are shifted by 90 degrees each other, a counter for storing the current angle or the current position, a memory for outputting a third sine wave and a fourth sine wave that are shifted by 90 degrees each other corresponding to an output of the counter, a first multiplying device for multiplying the first sine wave by the third sine wave, a second multiplying device for multiplying the second sine wave by the fourth sine wave, a subtracting device for subtracting a signal that is output from the first multiplying device from a signal that is output from the second multiplying device, an operation amplifying means for amplifying a signal that is output from the subtracting device, a model acceleration curve generating means for generating acceleration/deceleration pulses composed of an acceleration and a deceleration, a model velocity curve generating means for generating a velocity data sequence that is obtained by integrating the acceleration/deceleration pulses, a model position curve generating means for generating a position data sequence that is obtained by integrating the velocity data sequence, a means for increasing/decreasing the current angle or current position of the counter corresponding to an output of the operational amplifying means and outputting the increased or decreased angle or position as the current angle or current position, a position error extracting means for extracting a position error from the current angle or current position and the position data sequence, a velocity error extracting means for extracting a velocity error from the current velocity data and the velocity data sequence, the current velocity data being obtained by differentiating the current angle or current velocity, and a feedback loop means for adding the position error and the velocity error, amplifying the added data, and feeding back the amplified data to a driver for driving the actuator, wherein a servo operation of the servo apparatus is performed so that while the servo apparatus is being accelerated or decelerated, the position and the velocity of the servo apparatus do not deviate from a preset position curve and a preset velocity curve.

The present invention is a servo method, comprising the steps of causing an actuator composed of a coil and a magnet to perform a rotating operation or a reciprocal operation, detecting the angle or position of the actuator and outputting a first sine wave and a second sine wave that are shifted by 90 degrees each other, storing the current angle or the current position, outputting a third sine wave and a fourth sine wave that are shifted by 90 degrees each other corresponding to the current angle or current position that has been stored, causing a first multiplying device to multiply the first sine wave by the third sine wave, causing a second multiplying device to multiply the second sine wave by the fourth sine wave, causing a subtracting device to subtract a signal that is output from the first multiplying device from a signal that is output from the second multiplying device, causing an operation amplifying means to amplify a signal that is output from the subtracting device, generating acceleration/deceleration pulses composed of an acceleration and a deceleration, generating a velocity data sequence that is obtained by integrating the acceleration/deceleration pulses, generating a position data sequence that is obtained by integrating the velocity data sequence, increasing/decreasing the current angle or current position of the counter corresponding to an output of the operational amplifying means and outputting the increased or decreased angle or position as the current angle or current position, extracting a position error from the current angle or current position and the position data sequence, extracting a velocity error from the current velocity data and the velocity data sequence, the current velocity data being obtained by differentiating the current angle or current velocity, and forming a feedback loop means for adding the position error and the velocity error, amplifying the added data, and feeding back the amplified data to a driver for driving the actuator, wherein a servo operation is performed so that while accelerated or decelerated, the position and the velocity do not deviate from a preset position curve and a preset velocity curve.

The present invention is a motor, comprising a magnetic circuit having a first ring and a second ring secured on concentric circles, the first ring and the second ring being made of magnetic substances, 2n magnets being disposed on an inner periphery of the first ring and 2n magnets being disposed on an outer periphery of the second ring, the magnetic poles of the 2n magnets disposed on the inner periphery of the first ring being reverse of the magnetic poles of the 2n magnets disposed on the outer periphery of the second ring, and a two-phase or three-phase rotor having two or three coils each having 2n rectangular portions, the two or three coils being adhered so that they are shifted by (180/n) degrees or (120/n) degrees each other, wherein the two or three coils are inserted into the space in which the pair of the 2n magnets are disposed.

The present invention is a motor, comprises a magnetic circuit having a first ring and a second ring composed of magnets, the first ring having a magnetized peripheral surface, the second ring having a magnetized peripheral surface, the magnetic pole of the magnetized peripheral surface of the first ring being reverse of the magnetic pole of the magnetized peripheral surface of the second ring, the magnetized peripheral surface of the first ring and the magnetized peripheral surface of the second ring being oppositely secured, and a two-phase or three-phase rotor having two or three coils each having 2n rectangular portions, the two or three coils being adhered so that they are shifted by (180/n) degrees or (120/n) degrees each other, wherein the two or three coils are inserted into the space between the first ring and the second ring.

The present invention is a motor, comprising a magnetic circuit having a first ring and a second ring, the first ring being made of a magnet, the first ring having a magnetized peripheral surface, the second ring being made of a magnetic substance, the first ring and the second ring being secured on concentric circles, and a two-phase or three-phase rotor having two or three coils each having 2n rectangular portions, the two or three coils being adhered so that they are shifted by (180/n) degrees or (120/n) degrees each other, wherein the two or thee coils are inserted into the space between the first ring and the second ring that are secured.

An angle or a position for which an actuator composed of a coil and a magnet is rotated or reciprocated is detected by a sensor (two-phase MR sensor). The sensor outputs a first sine wave and a second sine wave (signal Vc and signal Vs) that are shifted by 90 degrees each other. A memory (cos ROM) 66 shown in FIG. 4 outputs a third sine wave and a fourth sine wave (signal Vsr and signal Vcr) that are shifted by 90 degrees each other corresponding to the current angle or the current position. The first sine and the third sine wave are multiplexed. The second sine wave and the fourth sine wave are multiplexed. The multiplexed result of the second sine wave and the fourth sine wave is subtracted from the multiplexed result of the first sine wave and the third sine wave. The subtracted result is amplified by an operational amplifying means (zero cross comparator). With the amplified signal, the actuator is driven. As a result, the actuator can be moved to a desired angle or a desired position.

BRIEF DESCRIPTION OF DRAWINGS

FIG. 1 is a block diagram showing a system according to the present invention;

FIG. 8 is a schematic diagram for explaining the present invention;

FIG. 56 is an external view showing a part that composes the motor according to the present invention;

FIG. 57 is an external view showing a part that composes the motor according to the present invention;

FIG. 58 is an external view showing a part that composes the motor according to the present invention;

BEST MODES FOR CARRYING OUT THE INVENTION

Figures 2A, 2B, 2C, 2D, 2E, 2F, 2G:
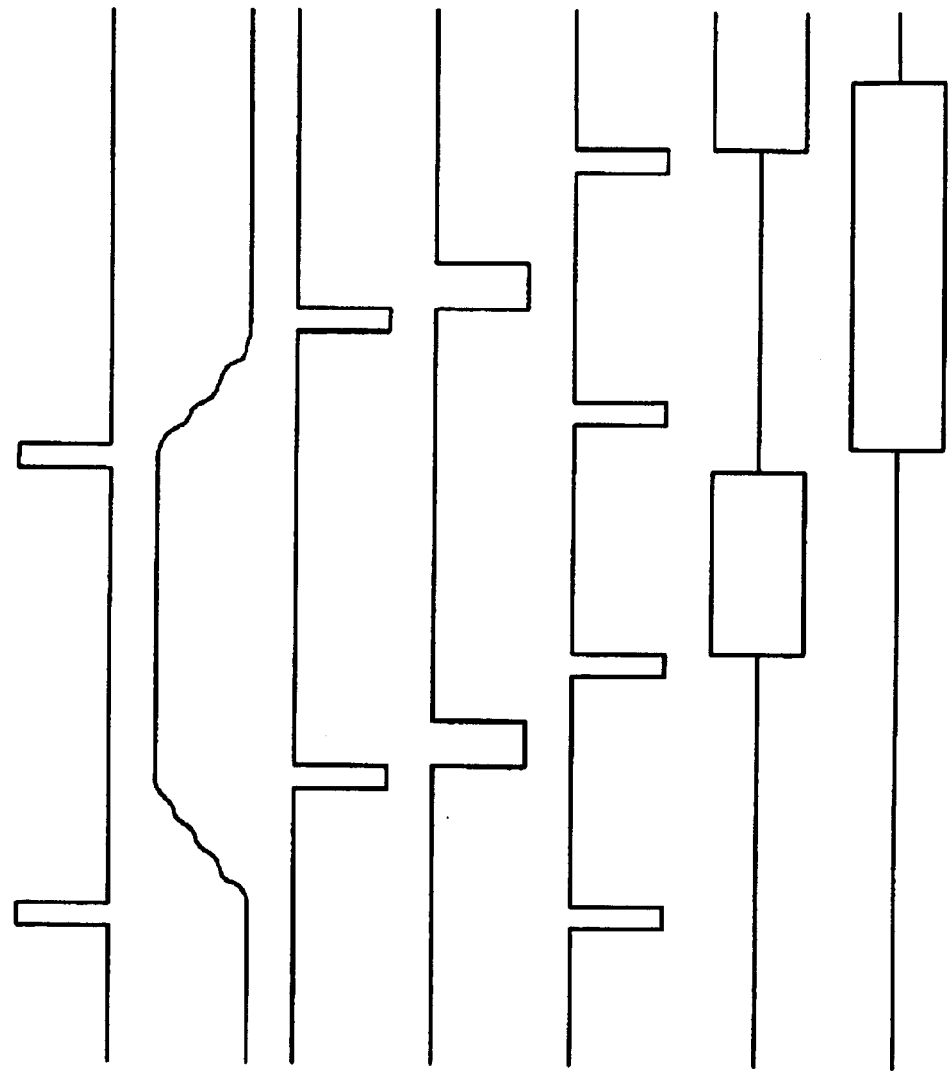
FIG. 2A to FIG. 2G are timing charts showing an example of the system according to the present invention.

Next, with reference to the accompanying drawings, an embodiment of the present invention will be described. For simplicity, in the drawings that follow, portions having similar functions will be denoted by similar reference numerals and their description will be omitted. FIG. 1 shows the overall structure of an embodiment according to the present invention. An image of an object is supplied to a camera block 2 through a mirror block 1. In the camera block 2, a focus, a zoom, a shutter speed, an iris, and so forth are controlled. In the example, the camera block 2 has a 10 times zoom lens. The camera block 2 is connected to a PC (Personal Computer) 3.

The PC 3 comprises an extension board 4 and a HDD (Hard Disk Drive) 5. The extension board 4 receives a picture signal from the camera block 2. The HDD 5 records a received picture signal. In addition, application software (AP) 6 that controls various photographing settings has been installed to the PC 3. As long as the extension board 4 can transmit a picture signal, it is not limited. In other words, the extension board 4 may be a board corresponding to IEEE (The Institute of Electrical and Electronics Engineers, Inc.) 1394 or USB (Universal Serial Bus). According to the embodiment, the extension board 4 is a board corresponding to IEEE 1394. The camera block 2 and the PC 3 are connected with a cable that corresponds to IEEE 1394. In this example, a picture signal is transmitted at 20 Mbps. A monitor 7, a keyboard (K/B) 8, and a mouse 9 are connected to the PC 3.

The mirror block 1 is controlled by a mirror servo circuit 11 and a controlling circuit 12. As will be described later, the mirror block 1 can rotate an active mirror in the horizontal direction by ±120 degrees. The active mirror can swing in the vertical direction by ±15 degrees. When the mirror of the mirror block 1 is swung in the vertical direction by ±15 degrees, the optical axis of the mirror block 1 is swung by ±30 degrees. The mirror servo circuit 11 controls the mirror block 1 corresponding to a signal received from the camera block 2 and a signal received from the controlling circuit 12. As the mirror block 1 is controlled, a trigger signal as a photographing timing is supplied from the mirror servo circuit 11 to the camera block 2. A power supply portion 13 supplies a power to those portions.

When the application software 6 is started, a picture signal received from the camera block 2 can be reproduced with a fast forward operation, a fast rewind operation, a pause stop operation, a slow forward reproduction operation, a slow backward reproduction operation, a step forward reproduction operation, a step backward reproduction operation, and so forth.

According to the embodiment, the mouse is used as an input device connected to the PC. However, in reality, any pointing device can be used instead of the mouse. For example, a touch panel, a joy stick, or a track ball can be used.

According to the embodiment, since the moving range of the mirror block 1 is as wide as ±120 degrees, a mechanical stopper that limits the mechanical operation of the mirror block 1 is disposed at nearly ±120 degrees. However, the mirror block 1 has a dynamic range of ±256 degrees so that the mirror block 1 operates at ±130 degrees. The mirror block 1 can be set in the vertical direction in the same manner as the horizontal direction.

Next, a signal flow and an operation of which a plurality of pictures (multi-picture) are photographed, combined, and displayed will be described according to the embodiment. Although a normal mode of which the direction of the optical axis is varied at regular speed or a kick mode of which the direction of the optical axis is varied at high speed can be selected, however, according to the embodiment, the kick mode has been selected. Data in the direction of the optical axis as a first photographing picture is transmitted from the PC 3 to the mirror servo circuit 11 through the camera block 2 at a timing shown in FIG. 2A. The mirror servo circuit 11 drives and moves the mirror of the mirror block 1 corresponding to the data that has been transmitted (see FIG. 2B). When the mirror is completely stopped, as shown in FIG. 2C, a trigger pulse is transmitted from the mirror servo circuit 11 to the camera block 2.

As shown in FIG. 2D, in the camera block 2, an image of the object is exposed to a CCD image pickup device for 10 msec. In such a manner, one picture is photographed. The corresponding picture signal is transmitted from the camera block 2 to the PC 3 corresponding to a frame synchronous signal (for example, a vertical synchronous signal VD (see FIG. 2E)) of the camera block 2 (see FIG. 2F). In this example, the interval between the exposure period and the vertical synchronous signal VD is not constant. When the transmission of the picture signal from the camera block 2 has been completed, the PC 3 detects that the picture has been transmitted. As shown in FIG. 2G, the application software 6 immediately processes the picture process and displays the processed picture at a predetermined position. After the picture signal has been transmitted from the camera block 2 to the PC 3, the next data in the direction of the optical axis is transmitted from the PC 3 to the camera block 2.

In such a manner, the camera block 2 can photograph pictures at a rate of 15 pictures per second. In the example, the picture signal of the photographed picture is transmitted from the camera block 2 to the PC 3 in one period of a vertical synchronous signal.

Figure 3:
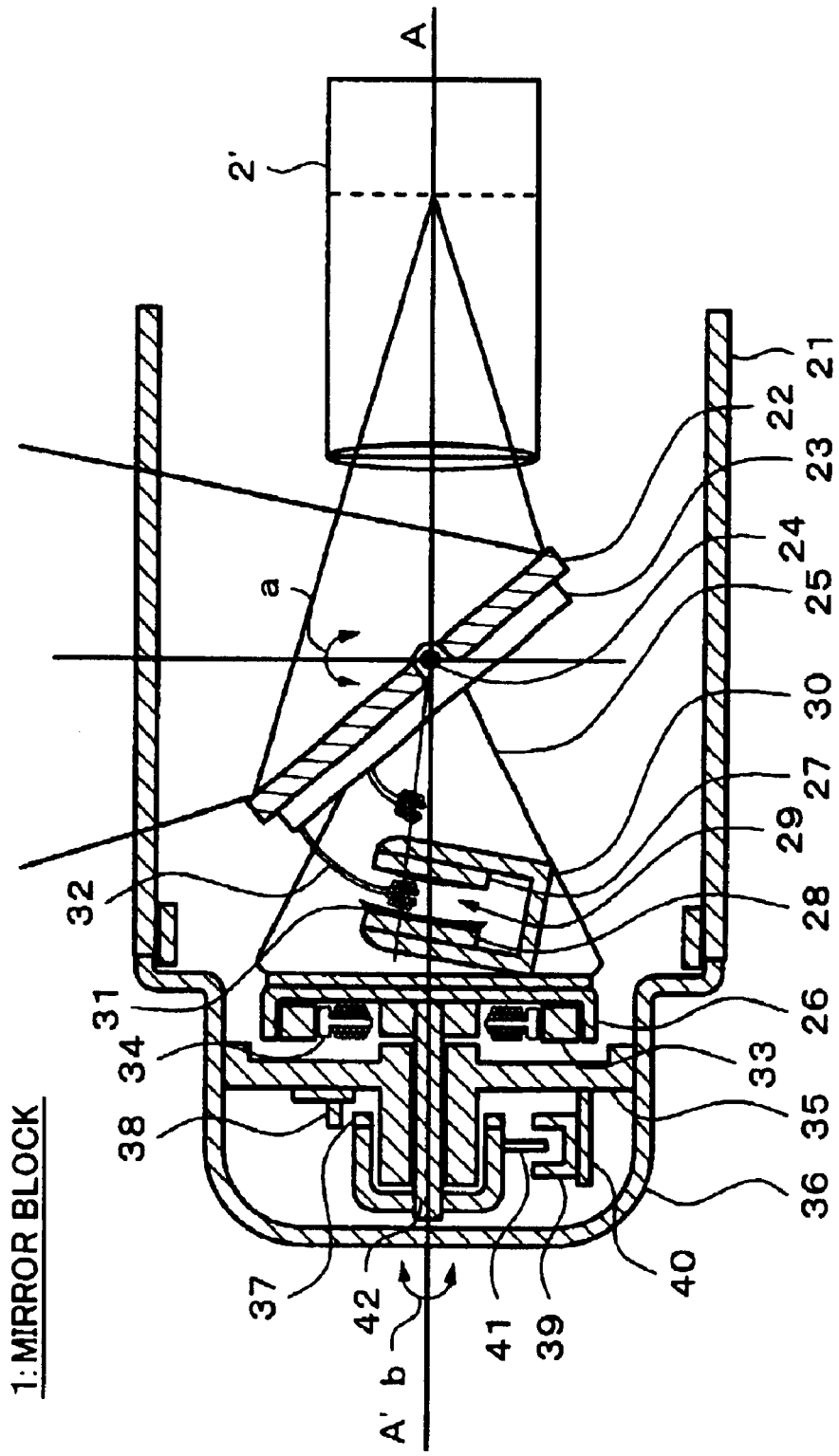
FIG. 3 is a schematic diagram showing an example of a mirror block according to the present invention.

Next, with reference to FIG. 3, an example of the mirror block 1 will be described. FIG. 3 is a sectional view showing the structure of an optical axis varying device. FIG. 3 also shows a camera block 2'. The camera block 2' comprises a lens group and a CCD image pickup device. The mirror block 1 is disposed in front of the camera block 2'. An image of an object enters the CCD image pickup device of the camera block 2' through a mirror 22 of the mirror block 1 and the lens group of the camera block 2'. In FIG. 3. A–A' represents an optical axis of the lens group.

Reference numeral 22 represents a plane mirror that reflects an image of the object to the CCD image pickup device. The mirror 22 can reflect an image in a desired range with a horizontal view angle from 4.6 [deg pp] to 10 [deg pp] corresponding to a swinging angle of ±15 degrees in the vertical direction. In addition, when the mirror 22 faces forward, it can reflect an image in a desired range with a horizontal view angle of 20 [deg pp]. For example, the mirror 22 has a size of which it can fully reflect an object of A4 size from the distance of 40 cm.

The mirror 22 is mounted on a supporting plate 23. The supporting plate 23 is rotated by around ±15 degrees as denoted by arrow a around a shaft portion 24. In other words, the shaft portion 24 is disposed so that it is perpendicular to optical axis A–A' of the camera block 2'. As a result, the mirror 22 can be rotated by around ±15 degrees in the direction with an angle of around 45 degrees to the optical axis A–A' of the camera block 2'. The shaft portion 24 is supported by a frame 25. The frame 25 is mounted on an outer periphery of a rotor 26 of a pan motor.

Reference numeral 30 represents a yoke that composes a magnetic circuit. The yoke 30 is made of soft iron. The yoke 30 has a one-side-open-box shaped section. Two magnets 27 and 28 are disposed on opposite inner peripheries of the yoke 30. The magnets 27 and 28 form a closed magnetic path. As a result, a strong magnetic field is generated at a gap 29 formed between the magnets 27 and 28. Like the frame 25, a magnetic circuit composed of the yoke 30 and the magnets 27 and 28 is mounted on an outer periphery of the rotor 26 of the pan motor.

Reference numeral 31 represents a nearly semicircular coil. The coil 31 is supported by a supporting piece 32 that extends from the supporting plate 23. The coil 31 is supported by a supporting piece 32 so that a straight portion of the coil 31 is positioned at the gap 29. Thus, when a current is supplied to the coil 31, a torque that causes the coil 31 and the supporting piece 32 to be rotated about the shaft portion 24 is generated in the gap 29 corresponding to the magnetic fields generated by the coil 31 and the magnets 27 and 28. In other words, a magnetic actuator is structured with the magnetic circuit (which is composed of the yoke 30 and the magnets 27 and 28), the coil 31, and the supporting piece 32. As shown in FIG. 3, the center of the coil 31 is positioned with an angle of 5 to 10 degrees against the optical axis A–A' of the camera block 2' so as to reduce the inertia moment due to the rotation of the rotor 26 (that will be described later).

Reference numeral 42 represents a shaft portion of the pan motor. The shaft portion 42 is positioned so that it matches the optical axis A–A' of the camera block 2'. The shaft portion 42 is supported by two ball bearings of a stator 35 so that the shaft portion 42 is freely rotatable. The shaft portion 42 and the rotor 26 are connected. A magnet 33 is disposed on an inner periphery of the rotor 26. The coil of the pan motor fixed to the stator 35 and a magnetic pole 34 are disposed at an opposite position of the magnet 33. Thus, when a current is supplied to the coil of the pan motor and the coil of the magnetic pole 34, a torque is generated about the shaft portion 42. As a result, the shaft portion 42 is rotated by ±120 degrees about the optical axis A–A' of the camera block 2' as denoted by arrow b.

Reference numeral 36 represents a dome shaped cover. The cover 36 secures the stator 35 of the pan motor. A transparent cover 21 extends from the cover 36. The transparent cover 21 is connected to the camera block 2' side.

A cup shaped extension portion is disposed on the opposite side of the shaft portion 42 of the pan motor to which the rotor 26 is connected. A ring shaped magnetic stripe 37 is formed at an edge portion of the extension portion. A light shield plate 41 is mounted to a predetermined position of the cup shaped extension portion. On the other hand, a two-phase MR (Magneto Resistance) sensor 38 as an example of a magnetic sensor is mounted to a predetermined position corresponding to the ring shaped magnetic stripe 37 of the stator 35. Whenever the shaft portion 42 is rotated, the two-phase MR sensor 38 outputs two sine waves shifted by 90 degrees. With an output signal of the two-phase MR sensor 38, the rotor 26 can be controlled at any angle in the unit of 0.25 degree. At a predetermined position corresponding to the light shield plate 41 of the stator 35, a photo interrupter 39 is mounted through a supporting piece 40. The photo interrupter 39 detects the horizontal angle of the mirror 22.

Those similar to the ring shaped magnetic stripe 37, light shield plate 41, two-phase MR sensor 38, and photo interrupter 39 are mounted between the supporting plate 23 and the frame 25. The two-phase MR sensor, photo interrupter, and so forth mounted between the supporting plate 23 and the frame 25 detect the vertical angle of the mirror 22.

The actuator as such an optical axis varying device is driven by the mirror servo corresponding to output signals of the two-phase MR sensor and the photo interrupter. As a result, the mirror 22 is rotated in the vertical direction and held in a predetermined direction. In addition, the pan motor is driven by a motor controlling circuit corresponding to the output signals of the two-phase MR sensor 38 and the photo interrupter 39. As a result, the mirror 22 and the frame 25 are rotated in for example the horizontal direction and held in a predetermined direction.

Figure 4A:
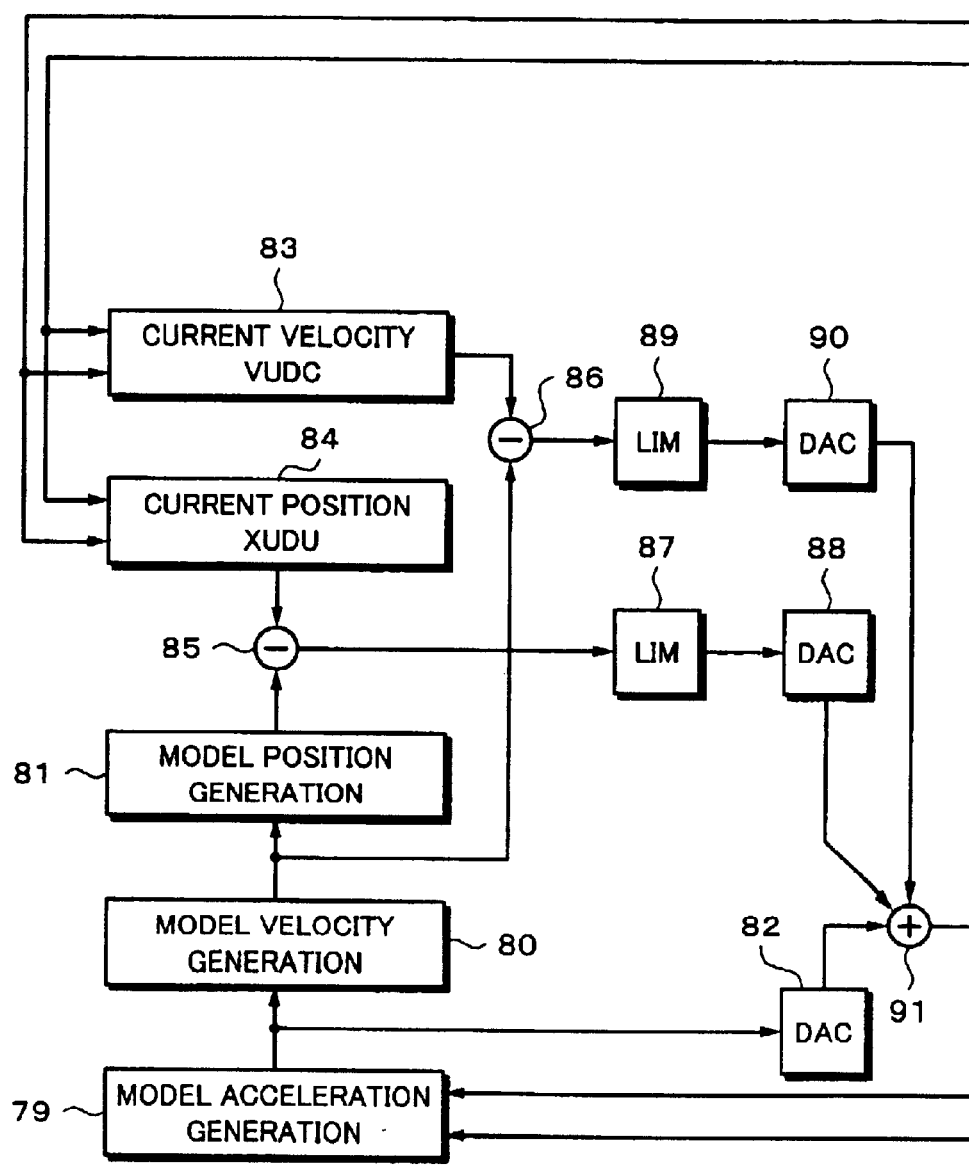
FIG. 4 is a circuit diagram showing an example of a mirror servo according to the present invention.
Figure 4B:
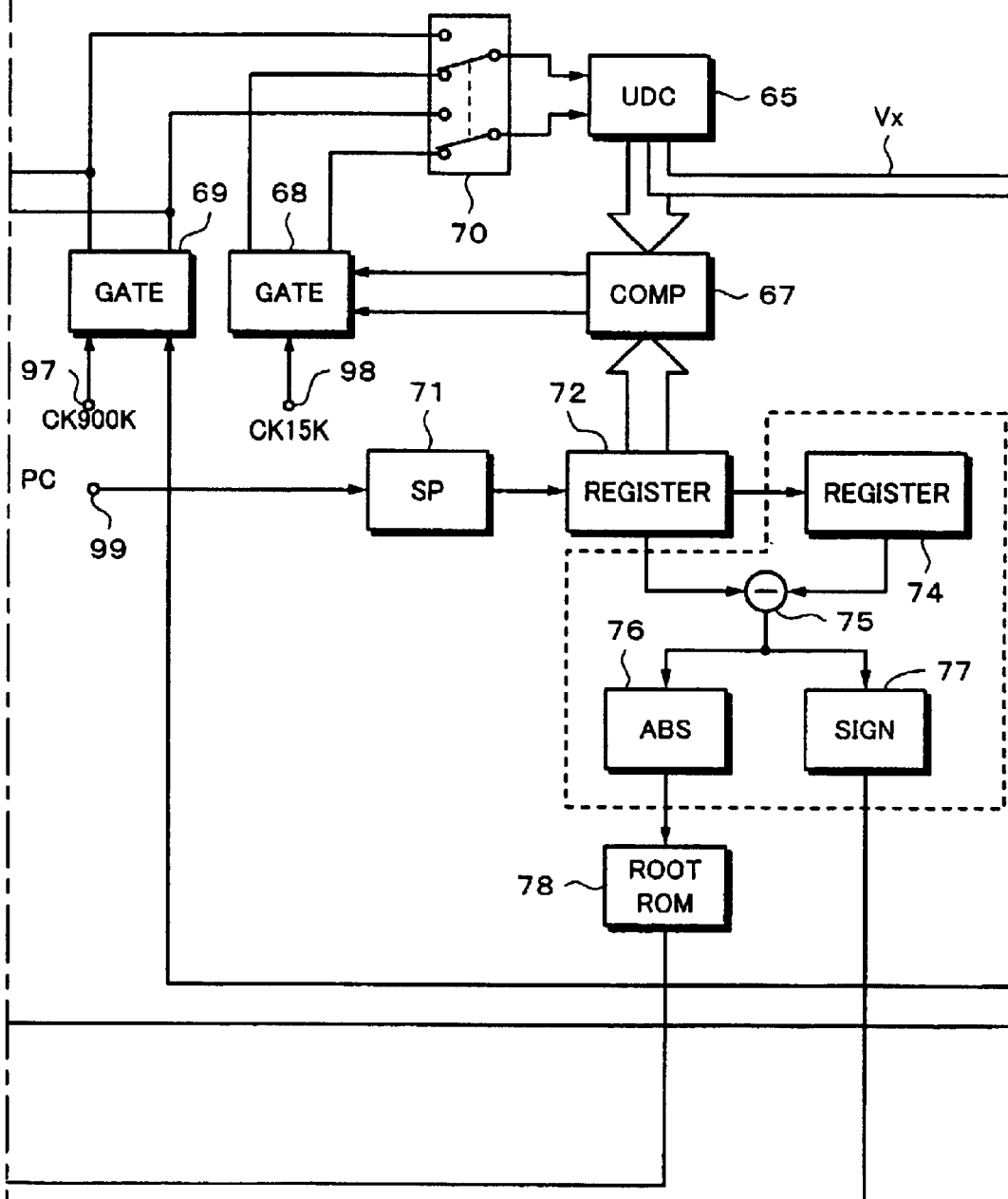
Figure 4C:
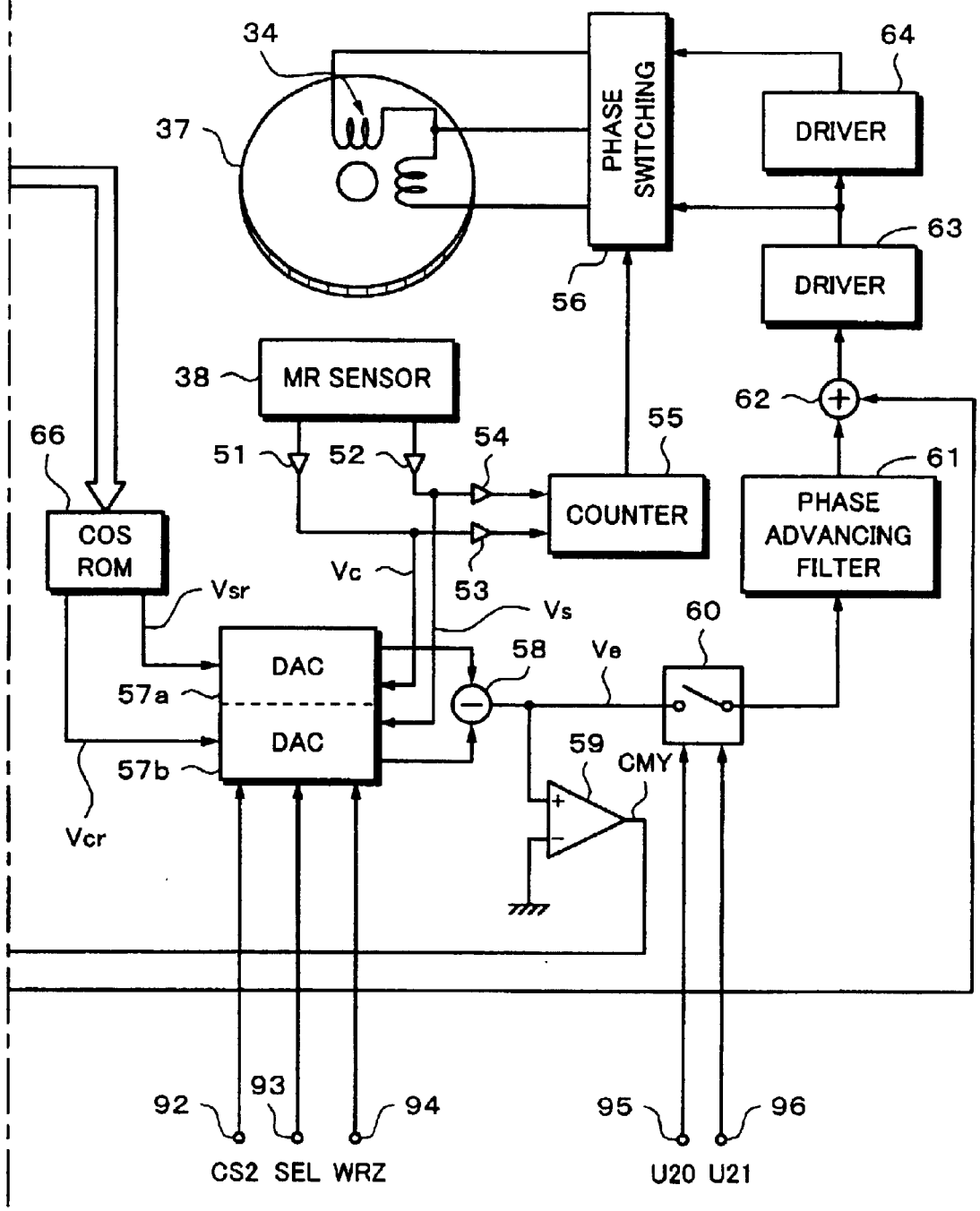

FIG. 4 is a block diagram showing the mirror servo circuit 11 according to an embodiment of the present invention. According to the embodiment, for simplicity, only a servo system that operates in only the horizontal direction will be described. The signals that are output from the two-phase MR sensor 38 are supplied to DC amplifiers 51 and 52. As was described above, one wave length of the signals that are output from the two-phase MR sensor 38 is equivalent to one degree. These signals are represented as θ[deg]. A signal of Vc=cos θ is output from the DC amplifier 51 to a D/A converter 57$a$. In addition, the signal is supplied to a counter 55 through a DC amplifier 53. Likewise, in the DC amplifier 52, a signal that is supplied from the two-phase MR sensor 38 is represented by θ [deg]. A signal of Vs=sin θ is output from the DC amplifier 52 to a D/A converter 57b. In addition, the signal is output to the counter 55 through a DC amplifier 54.

Low order eight bits of 17 bits that are output from an up-down counter 65 are supplied to a cos ROM 66. The low order eight bits are a decimal smaller than one degree and have a resolution of 1/256 degree. A signal Vsr that is output from the cos ROM 66 is supplied to the D/A converter 57a. A signal Vcr that is output from the cos ROM 66 is supplied to the D/A converter 57b.

The D/A converter 57a is a multiplication type D/A converter. For example, the D/A converter 57a multiplies the digital value Vsr by the analog value Vc and outputs the product as an analog signal. Likewise, the D/A converter 57b is a multiplication type D/A converter. The D/A converter 57b multiplies the digital value Vcr by the analog value Vs and outputs the product as an analog signal. A signal CS2, a signal SEL, and a signal WRZ are input from a terminal 92, a terminal 93, and a terminal 94, respectively, and supplied to the D/A converters 57a and 57b. Corresponding to the signal CS2, the D/A converters 57a and 57b become active. The signal SEL is used to select one of the D/A converters 57a and 57b. The signal WRZ is used to write the supplied signal to the selected D/A converter 57a or 57b. In other words, the signal CS2 causes the D/A converter 57a to be active. The signal SEL causes the D/A converter 57a to be selected. The signal WRZ causes the signal Vc supplied from the DC amplifier 51 and the signal vsr supplied from the cos ROM 66 to be written to the D/A converter 57a. As a result, a value of which the signal Vc and the signal Vsr are multiplied is output from the D/A converter 57a.

A subtracting device 58 obtains the difference between the outputs of the D/A converters 57a and 57b.

$$Ve = Vc \cdot Vsr - Vs \cdot Vcr = \cos \theta \sin x - \sin \theta \cos x = \sin(\theta - x)$$

where the result of θ−x is small, the following relation is obtained.

$$Ve \approx \theta - x$$

The signal Ve as the difference between the target phase and the current phase is supplied from the subtracting device 58 to a phase advancing filter 61 through a switch circuit 60. In addition, the signal Ve is supplied to a non-inverted input terminal of a zero-cross comparator 59. An inverted input terminal of the zero-cross comparator 59 is grounded. A signal CMY that is output from the zero-cross comparator 59 is supplied to a gate 69.

The zero-cross comparator 59 is a simple OP amplifier. The zero-cross comparator 59 outputs the current angle as a digital value in the unit of 1/256 degree. When the normal mode is switched to the kick mode, the switch circuit 60 is turned off. In addition, the switch circuit 70 is operated so that the gate 68 is switched to the gate 69. In the normal mode, the switch circuit 70 selects an output of the gate 68. In the kick mode, the switch circuit 70 selects an output of the gate 69. The signal level of the signal Ve, that is output from the subtracting device 58 is around 0 V due to a servo loop. However, in this state, the signal Ve is equal to the threshold voltage of the zero-cross comparator 59 (namely, the signal level of the signal Ve is nearly 0 V).

In the normal mode, a signal U20 supplied from a terminal 95 and a signal U21 supplied from a terminal 96 cause the switch circuit 60 to be turned on. In the kick mode, the signals U20 and U21 cause the switch circuit 60 to be turned off. The phase advancing filter 61 that designates the stability of the operation of the mirror block 1 filters the supplied signal Ve. The filtered signal is supplied to an adding device 62. The adding device 62 adds the signal Ve supplied from the phase advancing filter 61 and the signal supplied from an adding device 91 and supplies the added signal to a driver 63.

The driver 63 causes a current to flow in the pan motor corresponding to the supplied signal. A signal that causes the mirror 22 to be moved to a desired position is supplied to a phase switching circuit 56 and a driver 64. The driver 64 outputs a signal whose phase is different from the signal that is output from the driver 63. The output of the driver 64 is supplied to the phase switching circuit 56. When the output signal of the driver 63 is a normal phase, the output signal of the driver 64 is a reverse phase.

The coils of the pan motor are BTL (Balanced Transformerless) type coils each having two terminals driven with different phases. According to the embodiment, the two drivers 63 and 64 are disposed so as to drive the pan motor. Since the pan motor is a two-phase motor, it is necessary to control the four terminals of the two coils whenever the rotor is rotated every 15 degrees. In other words, the phases should be switched. The output signals of the DC amplifiers 51 and 52 are supplied to the counter 55. The counter 55 can monitor the variations of the output signals of the two-phase MR sensor 38 and detect the rotation of the rotor with a resolution of ¼ degree. Thus, whenever the counter 55 counts ¼ degree 60 times, the counter 55 outputs a coil switch signal to the phase switching circuit 56. When four terminals of the two coils controlled every 15 degrees, one cycle is completed with 60 degrees.

In such a manner, a current is supplied to the coils of the pan motor. As a result, the mirror 22 is rotated. Since the mirror 22 is rotated, the value θ that is obtained from the two-phase MR sensor 38 varies. Nearly at Ve=0, the servo is operated. The mirror 22 is held at the position corresponding to Ve=0. At that point, when the DC gain of the servo loop is sufficiently high, the mirror 22 is held at the position corresponding to Ve=0 (namely, θ=x).

When the signal Vx is incremented by 1, the target phase x is increased by 360/256=1.4 degrees. As a result, sin (1.4 degrees) takes place in the signal Ve. Since the signal is amplified, the value of θ is proportionally increased. Finally, the signal Ve becomes nearly 0. At that point, the mirror 22 is inclined by 1/256 degree.

A CK 15K supplied from a terminal 98 is a clock pulse as a reference of the counting speed of the up-down counter 65. The frequency of the CK 15K is around 14 kHz. The clock pulse CK 15K is supplied to the gate 68. A signal UP/signal DN is supplied from the gate 68 to the up-down counter 65 through the switch circuit 70 corresponding to a signal LT/signal GT supplied from a magnitude comparator 67. In the normal mode, the switch circuit 70 selects the output of the gate 68. In the kick mode, the switch circuit 70 selects the output of the gate 69.

The up-down counter 65 is a current angle register that stores the current horizontal angle of the mirror. The up-down counter 65 stores the current horizontal angle with data of 17 bits. The high order nine bits of 17 bits represent 0 to 511 degrees whose center angle is 256 degrees. The low order eight bits represent a decimal smaller than one degree and have a resolution of 1/256 degree. The up-down counter 65 supplies the data of 17 bits to a magnitude comparator 67.

The low order eight bits of 17 bits are supplied as a signal Vx to the cos ROM 66.

A target angle supplied from the PC 3 is supplied from a terminal 99 to a serial/parallel converting circuit 71 through for example RS-232C. The serial/parallel converting circuit 71 converts the, target angle supplied as serial data into parallel data. In the example, the target angle supplied as serial data is converted into data of 17 bits. The converted data of 17 bits is supplied from the serial/parallel converting circuit 71 to a target angle register 72. The target angle register 72 stores the supplied data of 17 bits. The stored data of 17 bits is supplied from the target angle register 72 to the magnitude comparator 67.

The magnitude comparator 67 compares data X of 17 bits supplied from the up-down counter 65 with data R of 17 bits supplied from the target angle register 72. In the case of data X<data R, a signal LT of high level is supplied-from the magnitude comparator 67 to the gate 68. In the case of data X>data R, a signal GT of high level is supplied from the magnitude comparator 67 to the gate 68.

When the signal LT of high level is supplied from the magnitude comparator 67 to the gate 68, a signal UP of around 14 kHz is supplied to the up-down counter 65. The up-down counter 65 up-counts the data stored in the current angle register at a velocity of around 14 kHz until the signal levels of the signals GT and LT that are output from the magnitude comparator 67 become low. When the signal levels of both the signals GT and LT supplied from the magnitude comparator 67 become low (namely, signal GT=signal LT), the up-down counter 65 stops the counting operation.

At that point, the low order eight bits of 17 bits of the up-down counter 65 cyclically vary from 0 to 255 or from 255 to 0. However, since the servo is securely locked, there is no possibility of which an error takes place. Since one pulse causes the mirror to be inclined by 1/256 degree, the moving velocity can be obtained from:

$$v=1/256 \times f[\text{degrees/second}]$$

when f=14 kHz, then v=56 [degrees/second].

The target angle register 72 supplies the stored data of 17 bits to a register 74. A subtracting device 75 subtracts the current target angle supplied from the target angle register 72 from the immediately preceding target angle supplied from the register 74. The subtracted result is supplied to an absolute value calculating circuit 76 and a SIGN circuit 77. The register 74, the subtracting device 75, the absolute value calculating circuit 76, and the SIGN circuit 77 compose an angular data change detecting circuit.

The absolute value calculating circuit 76 calculates the absolute value of the subtracted result. The absolute value is supplied to a root ROM 78. The root ROM 78 obtains the length of an acceleration/deceleration pulse from the absolute value of the jump angle. In the maximum acceleration/deceleration method according to the embodiment, since the moving angle is proportion to the square of the acceleration time, the function for obtaining the acceleration time from the moving angle is a root. In reality, since it takes a time for around seven clock pulses for the maximum acceleration/deceleration, a strict root is not used. The value of the length obtained by the root ROM 78 is supplied to a model acceleration generating circuit 79.

The SIGN circuit 77 detects the direction corresponding to the difference between the current target angle and the immediately preceding target angle from the supplied subtracted result. The detected direction is supplied to the model acceleration generating circuit 79.

Figures 5A, 5B, 5C:
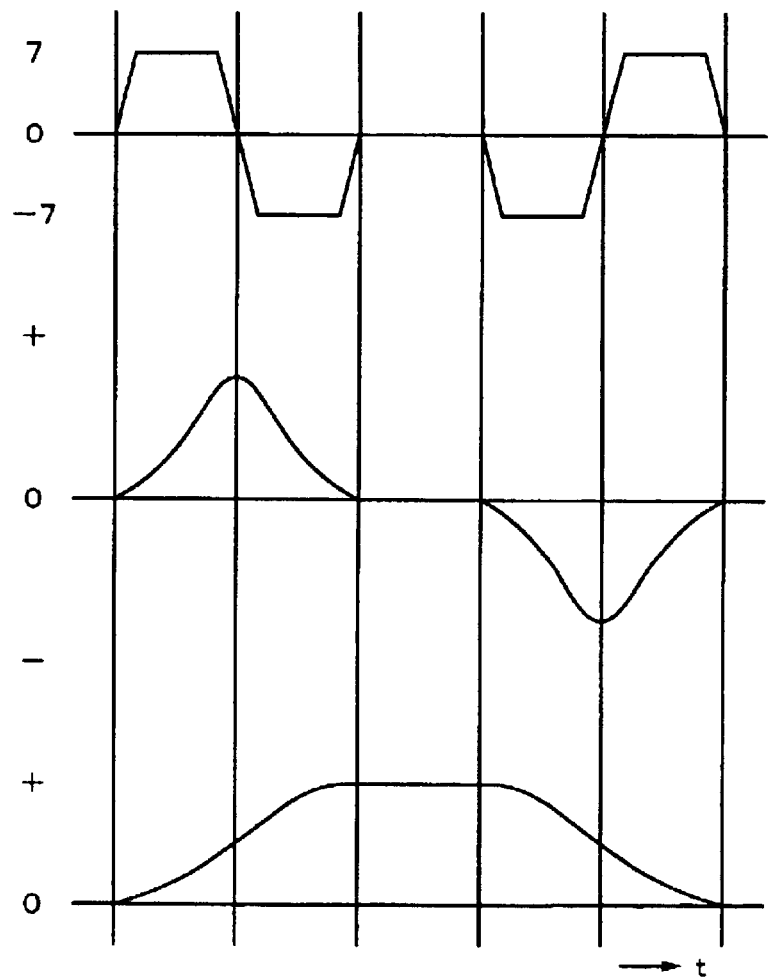
FIG. 5A to FIG. 5C are schematic diagrams for explaining the present invention.

A model acceleration curve has been set to the model acceleration generating circuit 79. In addition, the model acceleration generating circuit 79 uses a sampling clock of 4 kHz. An acceleration/deceleration pulse as shown in FIG. 5A is generated corresponding to a jump direction. The generated acceleration/deceleration pulse is supplied to a model velocity generating circuit 80 and a D/A converter 82. The value of the generated acceleration/deceleration pulse varies as a two's complement of four bits like 0→7→0→−7→0 or 0→−7→0→7→0. The D/A converter 82 converts the supplied acceleration/deceleration pulse into an analog value. The converted analog value is supplied to the adding device 91. In FIGS. 5A, 5B, and 5C, the horizontal axis represents a time axis.

A model velocity curve has been set to the model velocity generating circuit 80. The model velocity generating circuit 80 successively adds the acceleration/deceleration pulses with a sampling clock of 4 kHz (namely, integrates the acceleration/deceleration pulses) and generates a velocity data sequence. The generated velocity data sequence is supplied to a model position generating circuit 81 and a subtracting device 86. As shown in FIG. 5B, the value of the velocity data sequence increase from "0" or decreases and returns to "0" as a two's complement of 12 bits.

A model position curve has been set to the model position generating circuit 81. The model position generating circuit 81 successively adds a velocity data sequence (namely, integrates it) and generates a position data sequence. The position data sequence is supplied to a subtracting device 85. As shown in FIG. 5C, the value of the position data sequence increases from "0" or decreases to the target position as a two's complement of 17 bits.

The gate 69 supplies a clock pulse of 900 kHz received from a terminal 97 to the up-down counter 65, a current velocity detecting counter 83, and a current position detecting counter 84 through the switch circuit 70 corresponding to the signal CMY supplied from the zero-cross comparator 59. When the zero-cross comparator 59 supplies the signal CMY of high level to the gate 69, a signal DN of 900 kHz is supplied to the up-down counter 65 through the switch circuit 70. The up-down counter 65 down-counts data stored in the current angle register at a velocity of 900 kHz until the signal level of the signal CMY that is output from the zero-cross comparator 59 becomes "0".

The current velocity detecting counter 83 increases or decreases the counter value corresponding to the input of the signal UP or the signal DN supplied from the gate 69. In addition, the counter value is reset to "0" in the period of the sampling clock of 4 kHz. The counter value immediately before the reset operation is retained until the period of the next sampling clock pulse. Thus, the position is detected with a delay of the period of ½ clock pulse. An output of the current velocity detecting counter 83 is a two's complement of 12 bits supplied to the subtracting device 86.

The subtracting device 86 subtracts the velocity data sequence supplied from the model velocity generating circuit 80 from the counter value supplied from the current velocity detecting counter 83. The subtracted result is supplied to a limiter 89. The limiter 89 limits the supplied subtracted result to a predetermined value or below. A D/A converter 90 supplies an analog signal as velocity error data to the adding device 91.

The current position detecting counter 84 increases or decreases the counter value corresponding to the input of the signal UP or the signal UP supplied from the gate 69. The current position detecting counter 84 is an up-down counter that counts from "0" when the kick mode starts. An output of the current position detecting counter 84 is a two's complement of 16 bits supplied to the subtracting device 85.

The subtracting device 85 subtracts the position data sequence supplied from the model position generating circuit 81 from the counter value supplied from the current position detecting counter 84. The subtracted result is supplied to a limiter 87. The limiter 87 limits the supplied subtracted result to a predetermined value or below. A D/A converter 88 supplies an analog signal as position error data to the adding device 91.

The adding device 91 adds acceleration data, velocity error data, and position error data. The added data is supplied to the adding device 62. As a result, after the servo loop is turned off, the up-down counter 65 retains the current angle.

Next, an example of such an operation will be described. When the pan motor stops, if the signal level of the signal CMY that is output from the zero-cross comparator 59 is low due to a small offset thereof, the signal UP of 900 kHz is supplied to the up-down counter 65. As a result, the value of the up-down counter 65 is increased. Thus, the signal Ve increases. As a result, the signal level of the signal CMY becomes high. When the signal level of the signal CMY becomes high, the signal DN of 900 kHz is supplied to the up-down counter 65. As a result, the value of the up-down counter 65 decreases. Thus, the signal Ve decreases. Consequently, the signal level of the signal CMY becomes low. In such a manner, the value of the up-down counter 65 cyclically increases and decreases in a predetermined narrow range. A measured result shows that the narrow range is around 10. Thus, there is an error of around 10/256 degree.

When the pan motor is manually rotated, the phase of the two-phase MR sensor 38 is advanced. Thus, the signal CMY causes the value of the up-down counter 65 to be advanced. As a result, the value of the up-down counter 65 represents the rotating angle of the motor with an error of around 1/25 degree.

According to the embodiment, a clock frequency of 900 kHz is used for the operation of the gate 69. Next, the clock frequency that largely depends on the maximum velocity and the detection error will be described. When the motor is accelerated with acceleration a for t seconds, velocity v and moved distance x can be expressed by formulas (1) and (2).

$$v = a \cdot t \quad (1)$$

$$x = a \cdot t \cdot t / 2 \quad (2)$$

when the required time is denoted by T, if t=T/2, the velocity becomes maximum. When the maximum velocity is denoted by vm, it can be expressed by formula (3).

$$vm = a \cdot t / 2 \quad (3)$$

At that point, since the moved distance has reached the last moved distance X/2, the moved distance x can be expressed by formula (4).

$$x = a \cdot T \cdot T / 8 = X / 2 \quad (4)$$

When the motor is decelerated with acceleration −a for T/2 seconds, the velocity becomes 0. The moved distance X can be expressed by formula (5).

$$X = a \cdot T \cdot T / 4 \quad (5)$$

when acceleration a=20000 [degrees/second/second] and required time T=0.25 [second], applying formulas (3) and (5), the maximum velocity vm and the moved distance X become:

vm=2500 [degrees/second]

X=312 [degrees]

Thus, a through rate that exceeds the maximum velocity of 2500 [degrees/second] is required. To accomplish the through rate in the step of 1/256 degree, since vm=F/256, the frequency F [Hz] of the clock can be expressed by formula (6).

$$F = 256 \cdot vm = 640 \, [\text{kHz}] \quad (6)$$

Thus, it is clear that the frequency of the clock should be higher than 640 kHz. At that point, the slope of the increase/decrease should be larger than the slope of the maximum velocity.

Assuming that the delay of the signal by the zero-cross comparator 59, the up-down counter 65, the cos ROM 66, the D/A converters 57a and 57b, and the subtracting device 58 is denoted by td=4 µsec, with the number of clock pulses N in the period, the width xn of the non-sense zone can be obtained.

$$N = td \cdot F = (4E-6) \times (900E3) = (3.6(\%)) \quad (7)$$

$$xn = N/256 = 3.6/256 = 1/70 \, [\text{degree}] \quad (8)$$

Figure 6:
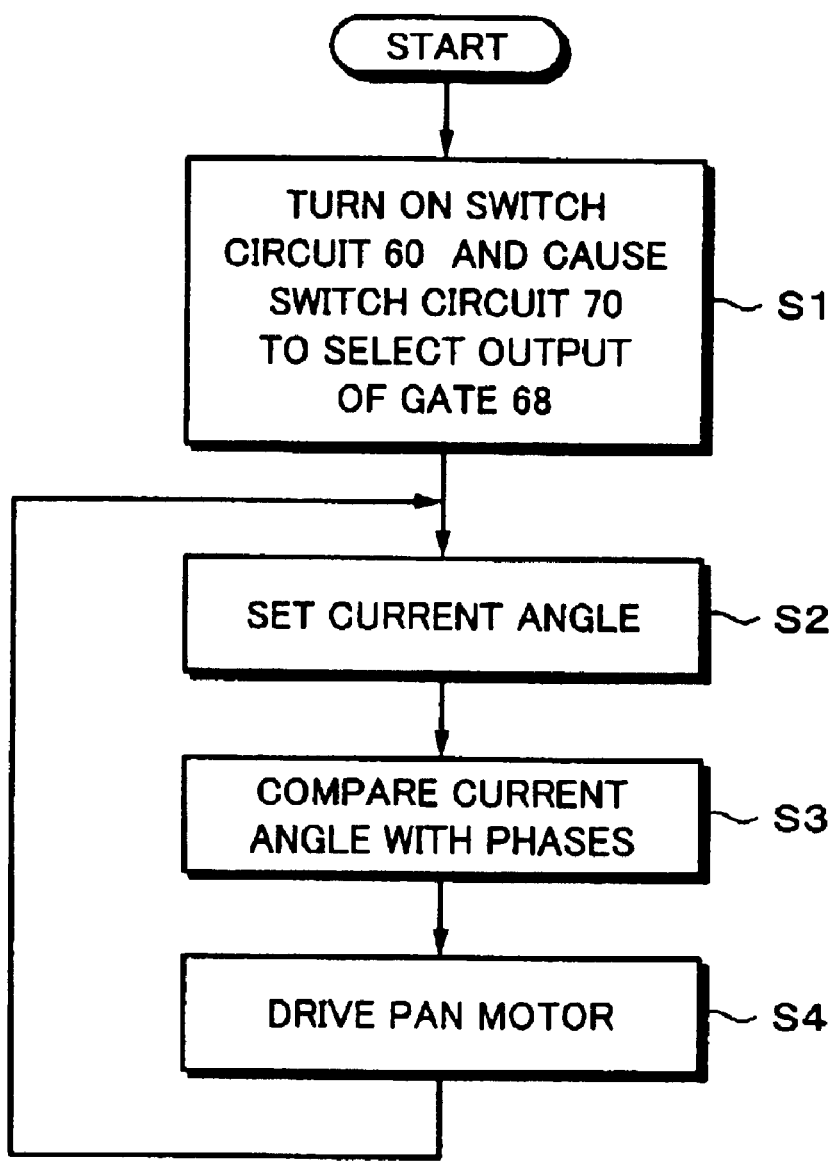
FIG. 6 is a flow chart for explaining a normal mode according to the present invention.

Next, with reference to a flow chart of FIG. 6, an example of a process for changing the direction of the optical axis in the normal mode will be described. When the normal mode is selected, at step S1, the switch circuit 60 is turned on. In addition, the switch circuit 70 is controlled so that the output of the gate 68 is selected. At step S2, the target angle stored in the target angle register 72 and the current angle (counter value) counted by the up-down counter 65 are compared by the magnitude comparator 67. As a result, the signal GT or the signal LT is supplied to the up-down counter 65. The up-down counter 65 increases or decreases the current angle (counter value) until signal GT=signal LT.

At step S3, an analog value of the low order eight bits of the up-down counter 65 and the phases of the two-phase MR sensor 38 are multiplied by the D/A converters 57a and 57b. The multiplied results are subtracted and compared by the subtracting device 58. At step S4, the subtracted result of the subtracting device 58 is supplied as the signal Ve to the drivers 63 and 64 through the phase advancing filter 61. The drivers 63 and 64 output currents that drive the pan motor.

Figure 7:
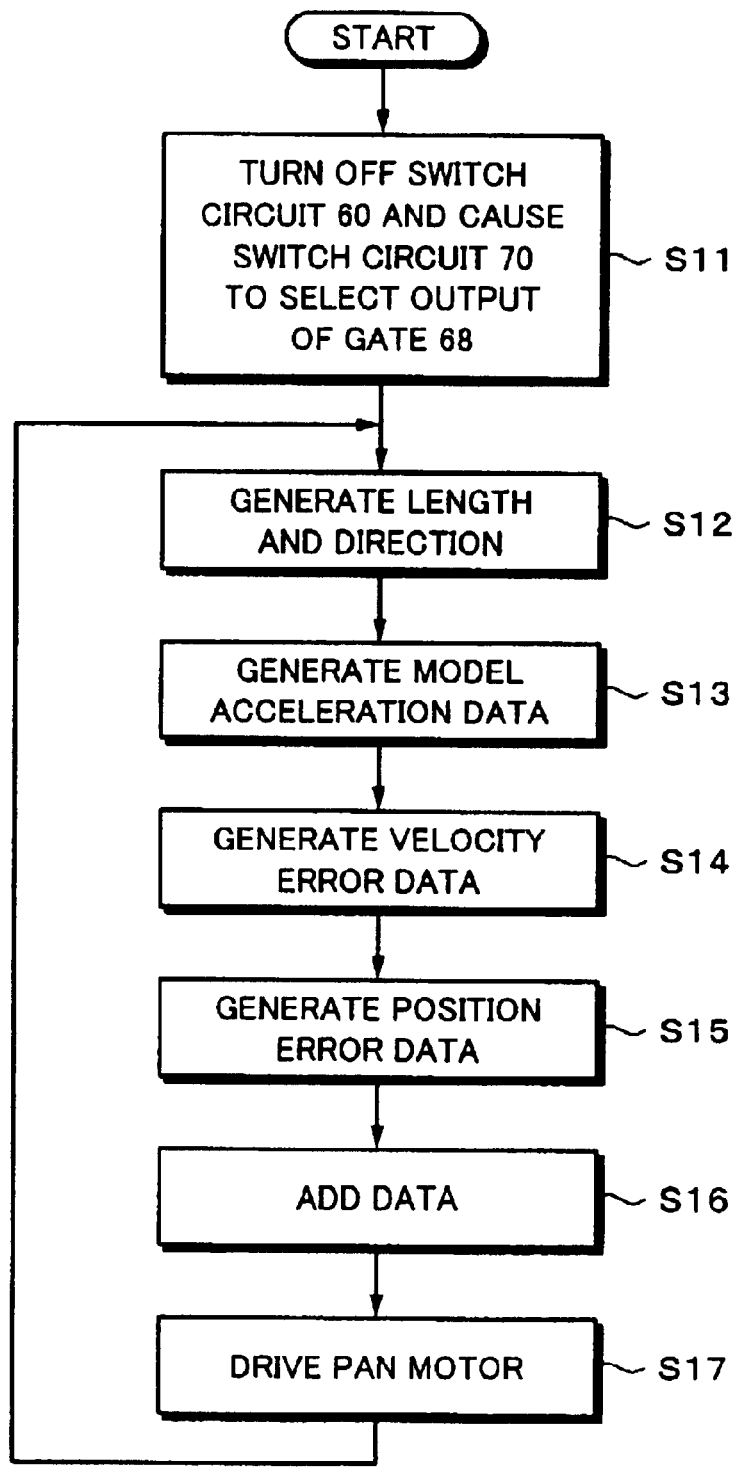
FIG. 7 is a flow chart for explaining a kick mode according to the present invention.

Next, with reference to a flow chart of FIG. 7, an example of a process for changing the direction of the optical axis in the kick mode will be described. When the kick mode is selected, at step S11, the switch circuit 60 is turned off. In addition, the switch circuit 70 is controlled so that the output of the gate 69 is selected. At step S12, the current target angle stored in the target angle register 72 is subtracted from the immediately preceding target angle stored in the register 74 by the subtracting device 75. The length (amount) and direction of which the immediately preceding angle is changed to the current target angle are generated with the subtracted result. At step S13, the model acceleration generating circuit 79 generates an acceleration/deceleration pulse with the generated length and direction.

At step S14, velocity error data is generated with the current velocity (counter value) of the current velocity detecting counter 83 and the velocity data sequence of the model velocity generating circuit 80. At step S15, position error data is generated with the current position (counter value) of the current position detecting counter 84 and the position data sequence of the model position generating circuit 81. At step S16, the acceleration/deceleration pulse, the velocity error data, and the position error data are added by the adding device 91. At step S17, the added result of the adding device 91 is supplied to the drivers 63 and 64. The drivers 63 and 64 output currents that drive the pan motor.

Unlike the normal mode, in the kick mode, an error between a preset model curve and a measured real curve is obtained. The obtained error is reversely fed back. As a result, the servo is performed so that the position and velocity do not deviate from the preset curve while the pan motor is being accelerated or decelerated.

Next, with reference to FIG. 8, the normal mode and the kick mode will be described. FIG. 8 shows the relation between a moving angle and required time. In FIG. 8, since the rotor according to the embodiment is rotated by only 240 degrees, values in parentheses "( )" represent estimated values (calculated values). As shown in FIG. 8, in the normal mode, moving velocity is proportional to time. In the normal mode, the moving velocity is 56 degrees/second. In contrast, in the kick mode, the moving velocity is proportional nearly to the square of time. In this example, in the kick mode, the moving velocity is 5000 degrees/second/second. In the kick mode, the required time is only acceleration/deceleration time. However, actually, time for which the servo becomes stable is required.

Figure 9:
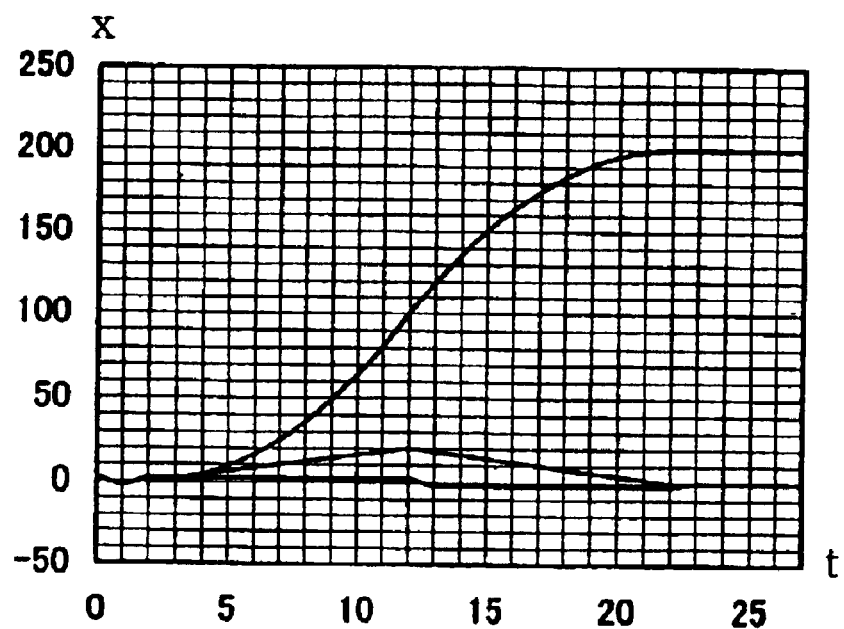
FIG. 9 is a schematic diagram for explaining the present invention.

Next, with reference to FIG. 9, an example of the operation in the kick mode will be described. As shown in FIG. 9, the position and velocity at particular time are calculated with those at the immediately preceding time so that the servo can be feed-back controlled. FIG. 9 shows the relation among position x, velocity v, and acceleration a. In this example, the pan motor is accelerated with acceleration a=2 from time t=0 to time t=10. In addition, the pan motor is decelerated with acceleration a=−2 from time t=10 to time t=20. Thus, position x=0 is changed to position x=20 at time t=20. At time t=20, the velocity becomes v=0.

Figure 10:
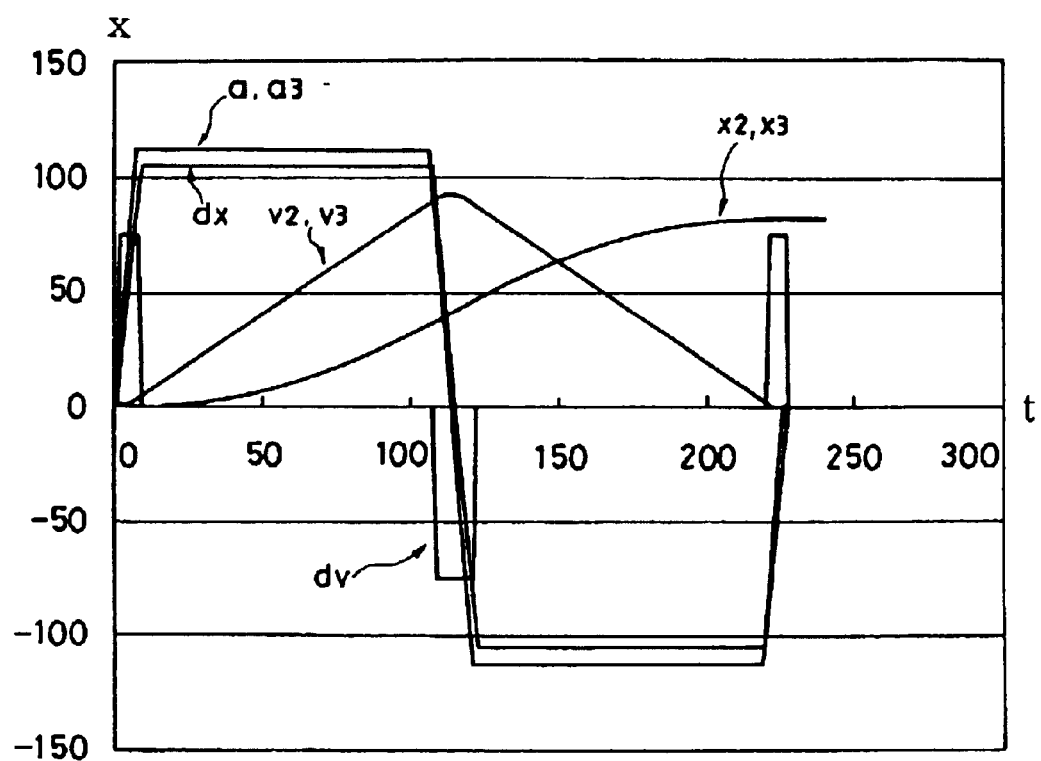
FIG. 10 is a schematic diagram for explaining the present invention.

In addition, as shown in a graph of FIG. 10, the pan motor is accelerated and decelerated in all the range from time t=0 to time t=256. In FIG. 10, 16 times model acceleration a, 16 times acceleration a3, 150 times position error dx, ⅛ times model velocity v2, ⅛ times real velocity v3, 1/1024 times model position x2, 1/1024 times real position x3, and 750 times velocity error dv are shown. A model acceleration curve that has been preset in the model acceleration generating circuit 79 is denoted by model acceleration a. A model velocity curve that has been preset in the model velocity generating circuit 80 is denoted by model velocity v2. A model position curve that has been preset in the model position generating circuit 81 is denoted by model position x2.

In FIG. 10, since countermeasures against vibration and noise are pre-taken, the model acceleration a is gradually changed. The model acceleration a is successively incremented by one in the range from 0 to 7. After the model acceleration a continues with acceleration=7 for 100 time units. Thereafter, the model acceleration a is successively decremented by one until acceleration=−7. After the model acceleration a continues with acceleration −7 for 100 time units. Thereafter, the model acceleration a is incremented by one until acceleration=0.

The model velocity v2 is obtained as follows.

$$v2\ [t]32\ v2\ [t-1]+a[t]$$

The model position x2 is obtained as follows.

$$x2\ [t]=x2\ [t-1]+(v2[t+1]+v2\ [t])/2$$

The velocity error dv is obtained by subtracting the real velocity v3 from the model velocity v2. The position error dx is obtained by subtracting the real position x3 from the model position x2. The velocity difference output dav and the position difference output dax are obtained by multiplying the velocity error dv and the position error dx by coefficients kv and kx, respectively.

The real acceleration a3 is obtained by multiplying the model acceleration a by the coefficient ka and by adding the added result, the immediately preceding velocity difference output dav [t−1] (one clock pulse prior) and the immediately preceding position difference output dax [t−1] (one clock pulse prior). The result is supplied to the coils of the pan motor.

FIG. 10 shows the relation of time t=255, position x=83846, and velocity v=0. The graph shown in FIG. 10 represents [ka:kv:kx]=[0.9:1.5:1.0] (namely, a3=0.9 x a+1.5 x dv+1.0 x dx). The coefficient ka of the model acceleration a is "0.9" instead of "1". This is because when the pan motor is accelerated and decelerated with a current 10% lower than the correct acceleration current, the insufficient current that is added to the real acceleration current is generated with the velocity error dv and the position error dx. Thus, to check the insufficient current to be added to the real acceleration current, the coefficient ka of the model acceleration a is intentionally designated as "0.9". As a result, it is clear that the position error dx is around 1/10 of the model acceleration a.

In addition, it is clear that at a portion of which the acceleration sharply varies the velocity error has been added to the acceleration current. This is because the position error is obtained by integrating the acceleration data two times, whereas the velocity error is obtained by integrating the acceleration data one time. This reason represents that it is important to feed-back the velocity error.

The graph shown in FIG. 10 shows that the velocity error dv and the position error are represented as large curves. However, as was described above, actually, the velocity error dv and the position error dx are very small values. The model acceleration a matches the real acceleration a3. The model velocity v2 matches the real velocity v3. The model position x2 matches the real position x3.

In graphs shown in FIG. 10 to FIG. 16, the horizontal axis and the vertical axis represent time t and position x, respectively.

Figure 11:
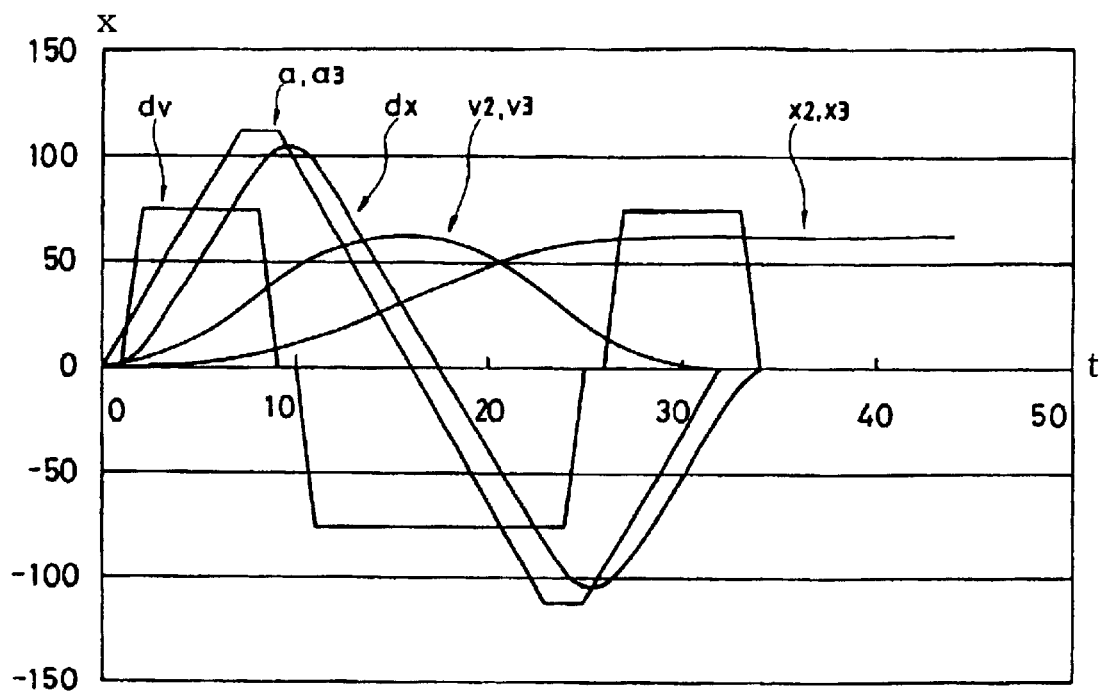
FIG. 11 is a schematic diagram for explaining the present invention.

According to the embodiment, since acceleration time or deceleration time (for 100 clock pulses) corresponds to a jump angle, the acceleration time or deceleration time is designated with a value from 2 to 128. FIG. 11 shows a graph in the case that acceleration time or deceleration time is for 2 clock pulses.

Figure 12:
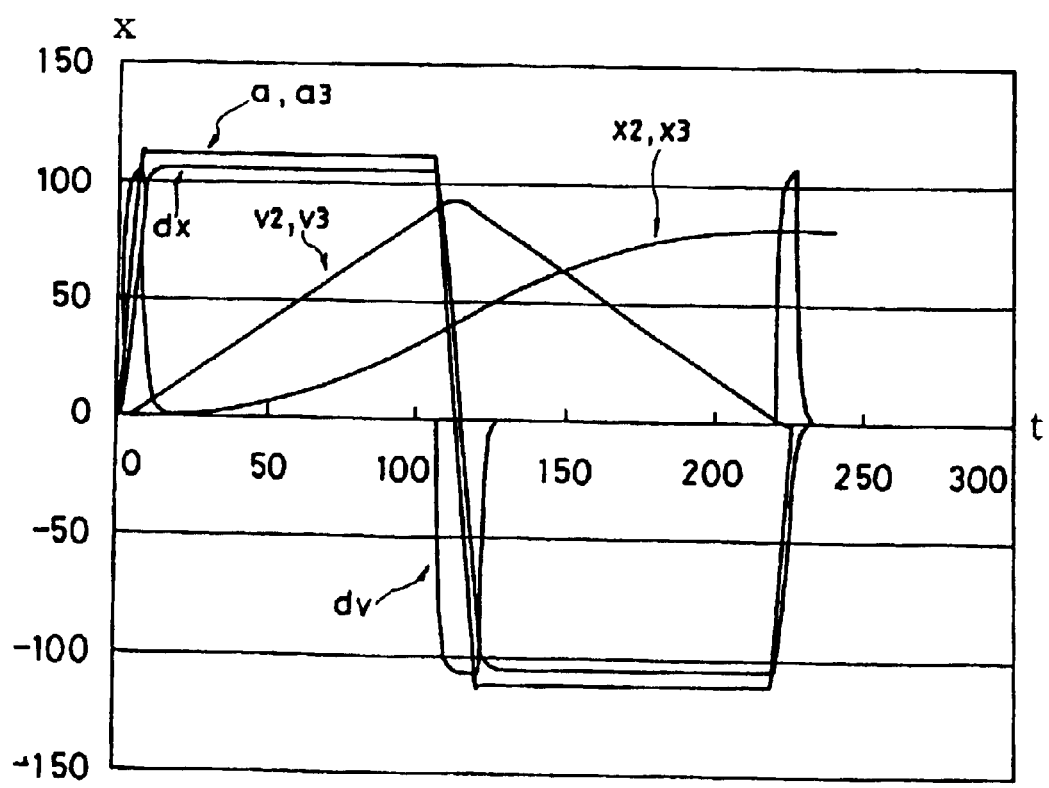
FIG. 12 is a schematic diagram for explaining the present invention.

FIG. 12 shows a graph in the case that acceleration time or deceleration time is for 100 clock pulses and coefficients are [ka:kv:kx]=[0.9:1.5: 0.7]. FIG. 12 shows that the gain of the position error is reversely proportion to the velocity error.

Figure 13:
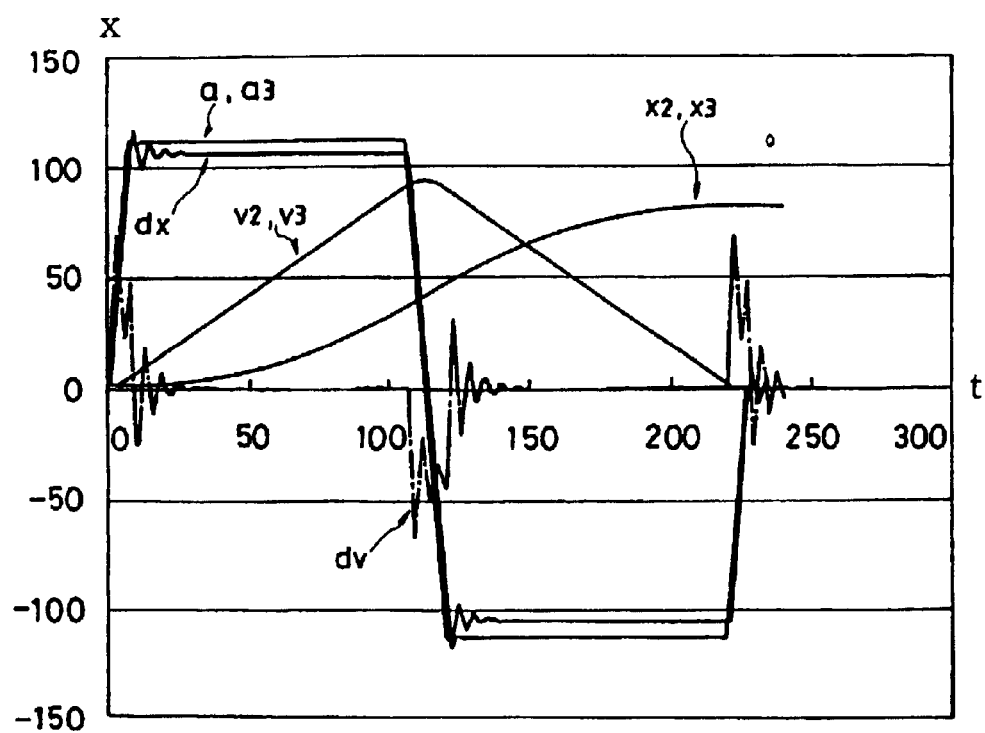
FIG. 13 is a schematic diagram for explaining the present invention.
Figure 14:
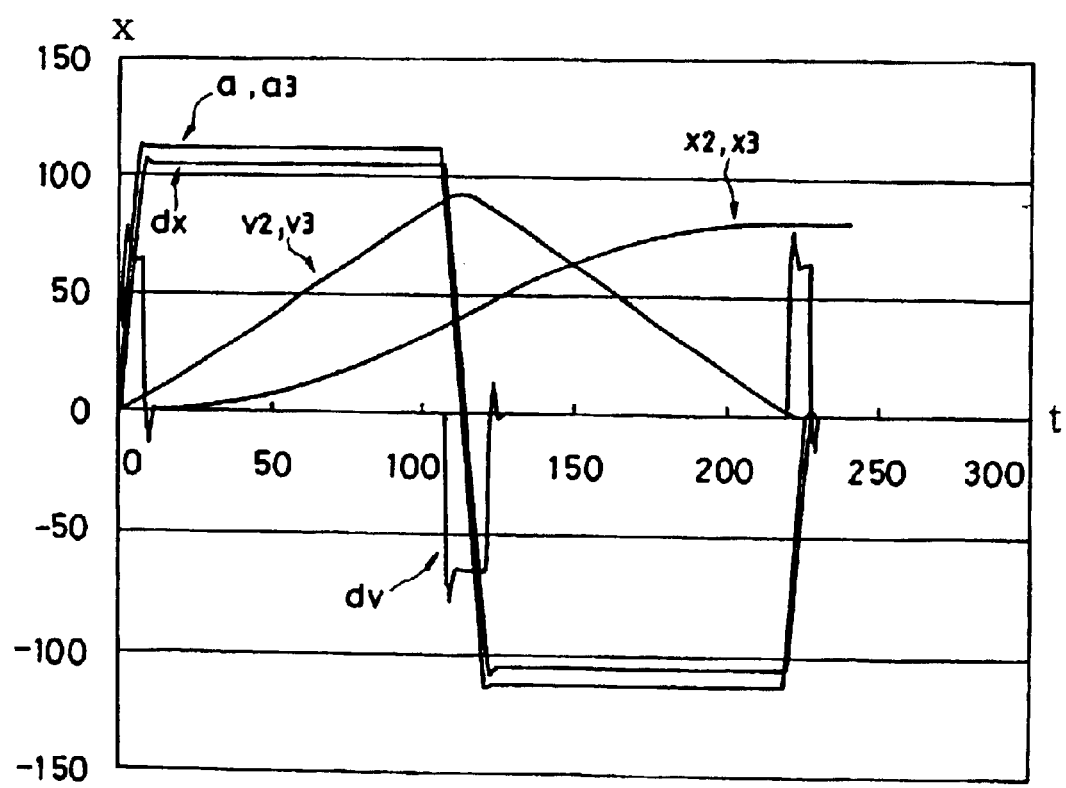
FIG. 14 is a schematic diagram for explaining the present invention.

FIG. 13 shows a graph in the case that coefficients are [ka:kv:kx]=[0.9:0.8:1.0]. FIG. 13 shows that since the gain of the velocity error is very low, a vibration takes place. FIG. 14 shows a graph in the case that coefficients are [ka:kv:kz]= [0.9:1.3:1.0]. FIG. 14 shows that since the gain of the velocity error is relatively low, an overshoot takes place.

Figure 15:
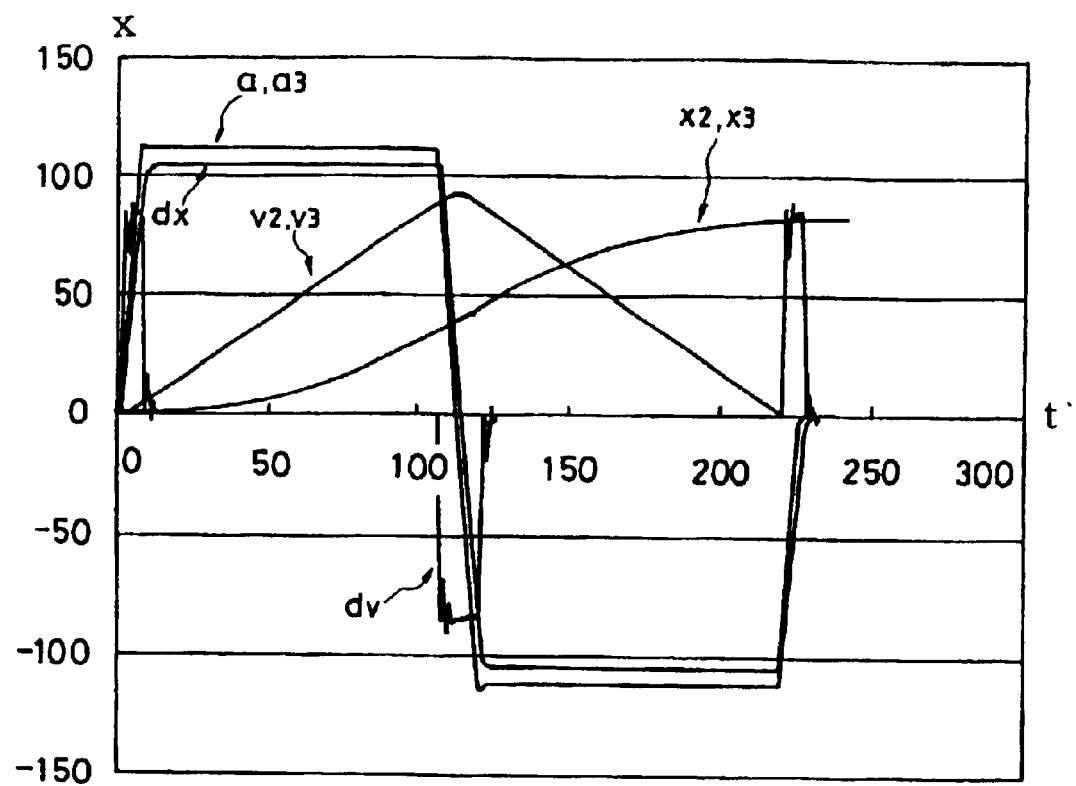
FIG. 15 is a schematic diagram for explaining the present invention.
Figure 16:
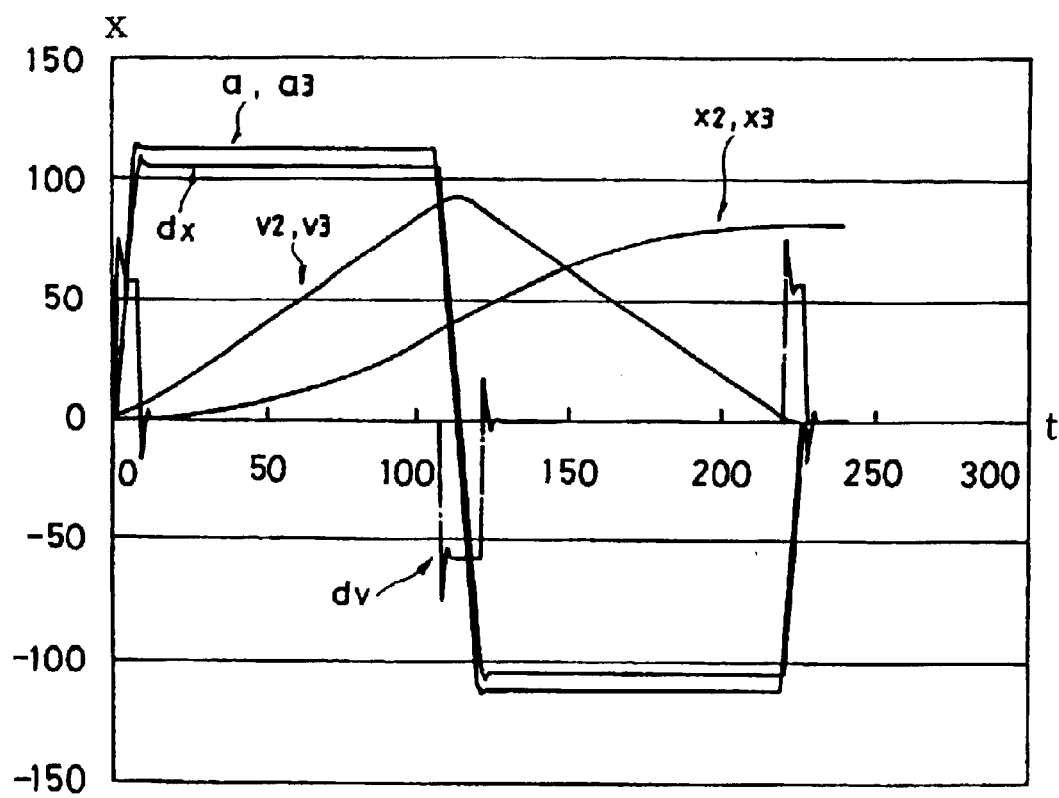
FIG. 16 is a schematic diagram for explaining the present invention.

FIG. 15 shows a graph in the case that coefficients are [ka:kv:kx]=[0.9:1.7:1.0]. FIG. 15 shows that since the gain of the velocity error is high, a vibration takes place. FIG. 16 shows a graph in the case that coefficients are [ka:kv:kx]= [0.9:1.5:1.3]. FIG. 16 shows that since the gain of the position error is relatively high, an overshoot takes place.

Next, the cumulation of errors due to mode changes between the normal mode and the kick mode will be described. First of all, the servo is locked and the pan motor is stopped. At that point, it is assumed that final target angle R=0 deg, target angle x=0 degree, and difference between target angle x and current angle θ is θ−x=0 degree. Thus, the voltage Vz=0 V. The switch circuit 60 is turned off. The signal UP/signal DN supplied to the up-down counter 65 is switched from the output of the magnitude comparator 67 to the output (signal CMY) of the zero-cross comparator 59.

The zero-cross comparator 59 is slightly affected by the offset voltage Vos. For example, assuming that the offset voltage Vos is 10 mV, when the signal level of the signal CMY becomes low, the signal DN of 900 kHz is continuously supplied to the up-down counter 65. As a result, the target angle x decreases and the voltage Vz rises and exceeds the offset voltage Vos.

When the voltage Vz exceeds the offset voltage Vos, the signal level of the signal CMY becomes high. When the signal level of the signal CMY becomes high, the signal UP of 900 kHz is continuously supplied to the up-down counter 65. As a result, the target angle X increases and the voltage Vz becomes lower than the offset voltage Vos. In such a manner, the voltage Vz continuously varies around the offset voltage Vos in a small variation level.

After the pan motor is accelerated and decelerated, the switch circuit 60 is turned on. As a result, a servo loop in the normal mode is formed. Since the voltage Vz is basically around 0 V. Thus, when switch circuit 60 is operated. the mode is smoothly changed. As a result, when the mode is changed between the normal mode and the kick mode, no error is cumulated.

Figure 17:
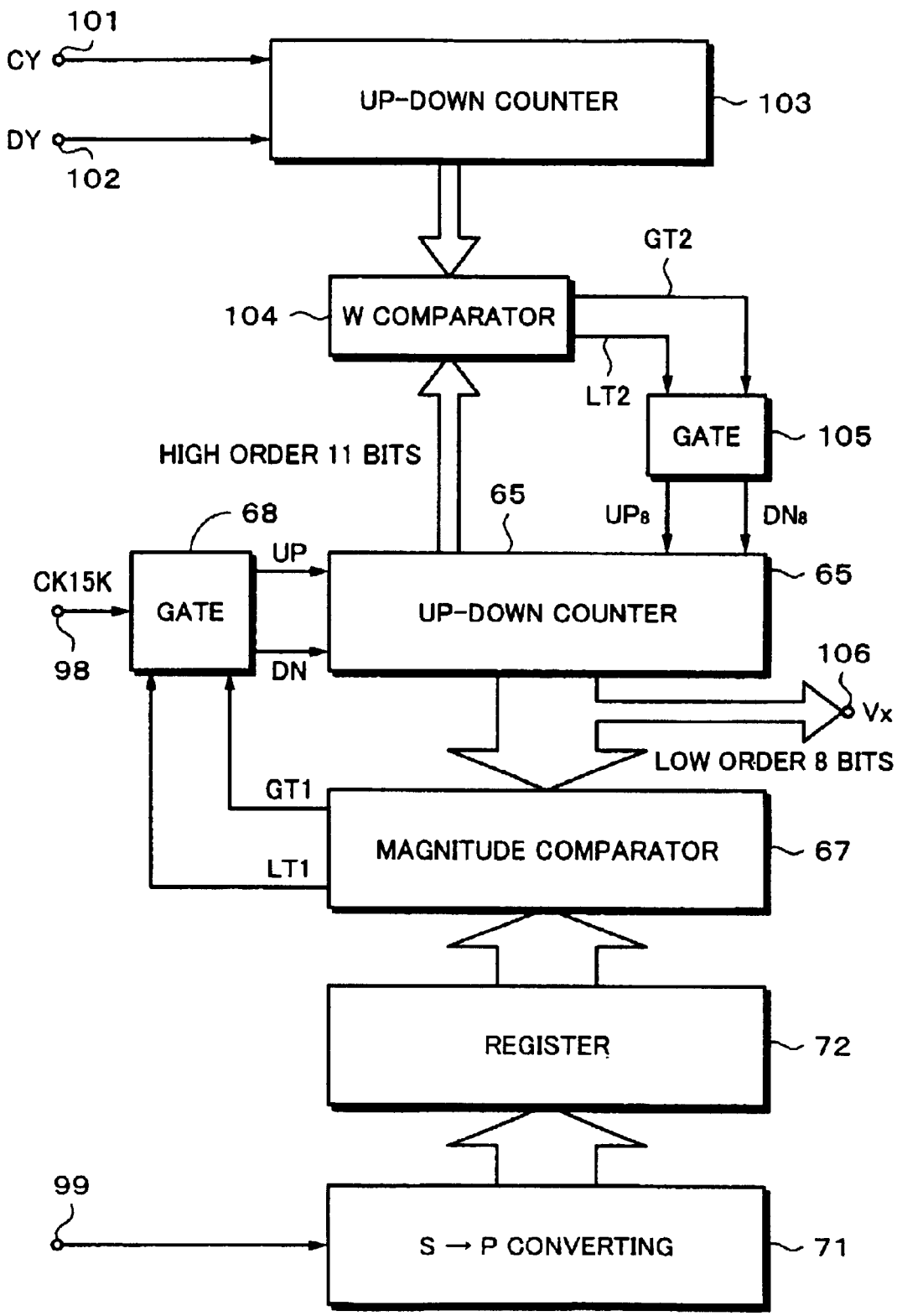
FIG. 17 is a block diagram for an abnormal recovery according to the present invention.

Next, with reference to FIG. 17, an example of a process for restoring an error state to an original state will be described. Although the mirror block 1 has many lock points in the unit of one degree, they are not any fragments of one degree. Thus, an angle stored in the up-down counter 65 and an angle of an up-down counter 103 are compared. When the difference is smaller than 0.5 degree, it is determined as OK. In contrast, when the difference exceeds 0.5 degree, it is determined as NG. Depending on whether the difference is positive or negative, a pulse $UP_8$ or a pulse $DN_8$ is supplied to bit 8 of the up-down counter 65.

As an example, it is assumed that "100+100/256 [deg]" has been stored in the target angle register 72. In the normal stable state, the angle of the up-down counter 65 is also "100+100/256 [deg]". Thus, the signal levels of the signal GT and the signal LT that are output from the magnitude comparator 67 to the gate 68 are low. At that point, the angle of the up-down counter 103 is around "100+¼ [deg]". Since this value does not contain low order six bits, there is an inaccuracy of ±¼ degree. A window comparator 104 has an insensitive zone of ±0.5 degree. Thus, in the correct stable state, the signal levels of the signal GT2 and the signal LT2 that are output from the window comparator 104 to a gate 105 are low.

Now, it is assumed that the pan motor is locked with a shift of three degrees due to an external force or the like. In this case, an angle stored in the target angle register 72 and an angle of the updown counter 65 are not varied. Thus, the angle of the up-down counter 103 is "103+¼±¼ [deg]". As a result, the signal GT2 of high level is supplied from the window comparator 104 to the gate 105. The gate 105 supplies a pulse $UP_8$ to the up-down counter 65 so that "256" is added to the angle of the up-down counter 65. When the pulse $UP_8$ is supplied to the up-down counter 65, the angle thereof becomes "100+100/256 [deg]". However, the signal level of the signal GT2 supplied from the window comparator 104 to the gate 105 is still high. Thus, the pulses $UP_8$ are continuously supplied from the gate 105 to the up-down counter 65 until the signal level of the signal GT2 becomes low.

In the example, when the pulse $UP_8$ is supplied to the up-down counter 65 three times, the angle thereof becomes "103+100/256 [deg]". As a result, the signal level of the signal GT2 becomes low. Thus, the window comparator 104 becomes normal. However, the magnitude comparator 67 that compares the angle stored in the target angle register 72 with the angle of the up-down counter 65 recognizes a difference of three degrees. Thus, the signal level of the signal GT supplied from the magnitude comparator 67 to the gate 68 becomes high. As a result, the signal UP is supplied to the up-down counter 65. Consequently, as the angle of the up-down counter 65 increases, the motor rotates by ¹⁄₂₅₆ degree per pulse. Whenever the motor rotates by ¼ degree, the angle of the up-down counter 103 increases. When the angle stored in the target angle register 72 becomes equal to the angle of the up-down counter 65, the signal level of the signal GT supplied from the magnitude comparator 67 to the gate 68 becomes low. As a result, the pan motor is stopped. Consequently, everything becomes the original state.

Next, the motor used as the forgoing pan motor will be described. The embodiment is applied to a motor having a large start torque against the power consumption. In addition, when the mass of the rotor is large, even if the start torque is large, a high velocity cannot be obtained. Thus, according to the embodiment, a rotor having a small mass is selected.

Figure 18:
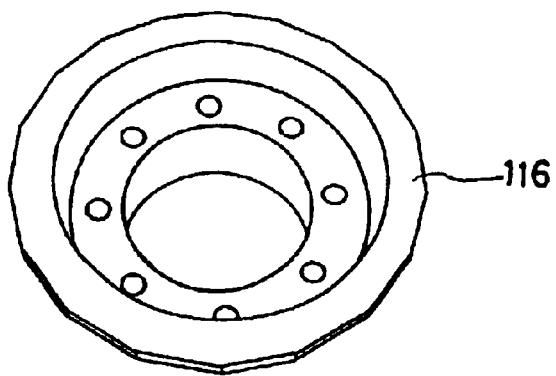
FIG. 18 is an external view showing a part that composes a motor according to the present invention.
Figure 19:
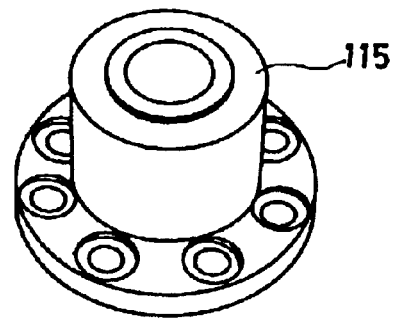
FIG. 19 is an external view showing a part that composes the motor according to the present invention.
Figure 20:
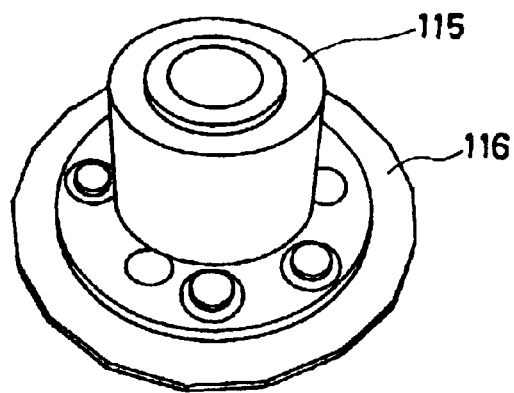
FIG. 20 is an external view showing a part that composes the motor according to the present invention.
Figure 21:
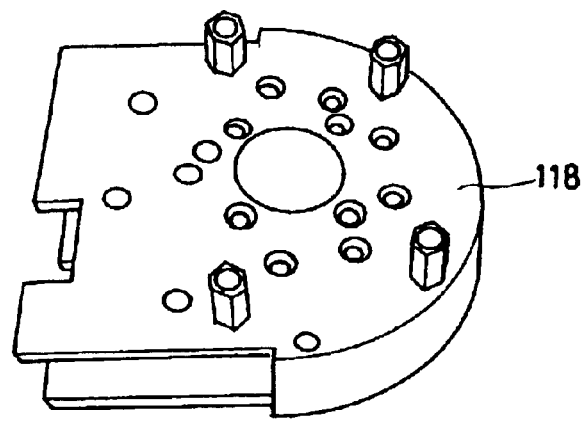
FIG. 21 is an external view showing a part that composes the motor according to the present invention.
Figure 22:
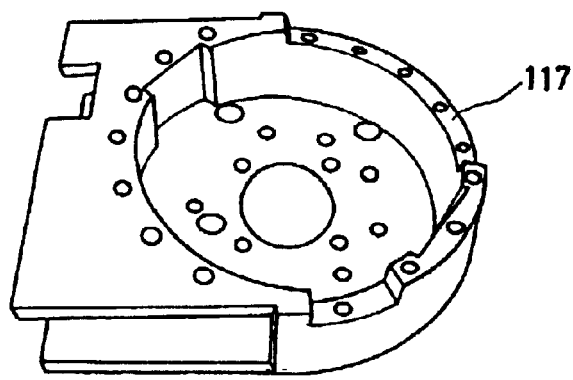
FIG. 22 is an external view showing a part that composes the motor according to the present invention.
Figure 23:
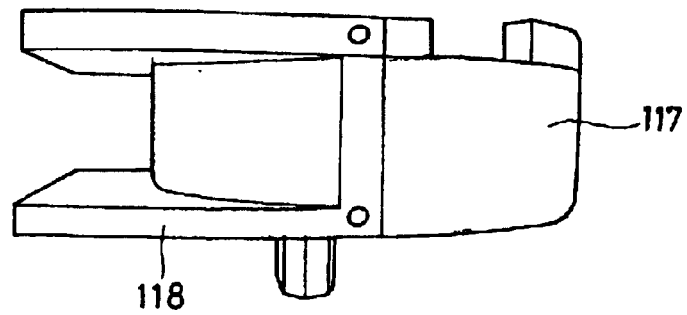
FIG. 23 is an external view showing a part that composes the motor according to the present invention.
Figure 24:
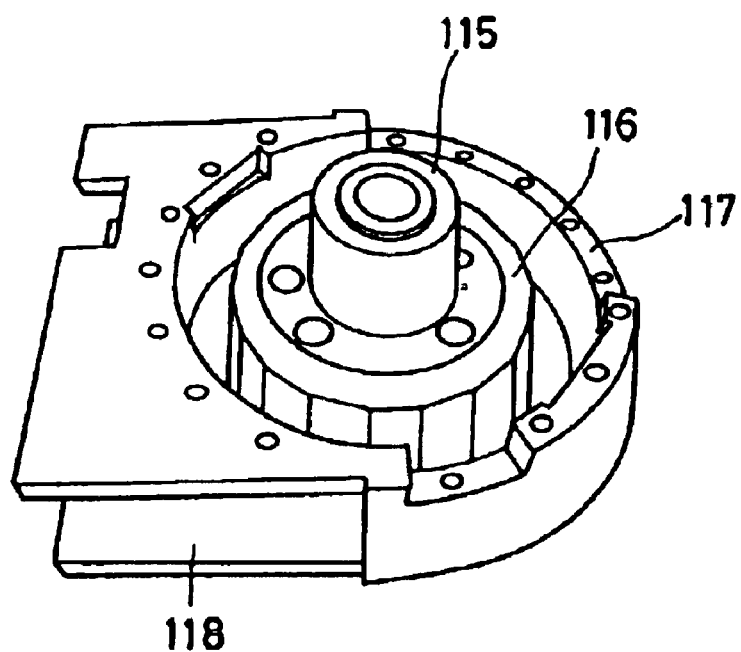
FIG. 24 is an external view showing a part that composes the motor according to the present invention.

Next, parts that compose the motor according to the embodiment will be described. An inner ring 116 shown in FIG. 18 is a yoke made of soft yoke and having a regular 18-sided polygonal shape. The height of the inner ring 116, the inner diameter thereof, and the outer diameter thereof are 16 mm, 33 mm, and 41 mm, respectively. Magnets are disposed outside the inner ring 116. FIG. 19 shows a bearing 115. FIG. 20 shows the inner ring 116 and the bearing 115 that are secured with a plurality of machine screws. At that point, an assembly of an aluminum rotor 112 shown in FIG. 91 and a shaft 111 that are secured with a machine screw is prepared. The assembly of the rotor 112 and the shaft 111 is inserted into the assembly of the inner ring 116 and the bearing 115 that are secured with the machine screws. The shaft 111 is rotated so that the eccentricity and the inclination thereof become small. Thereafter, the inner ring 116 and the bearing 115 are secured with adhesive agent. FIG. 21 shows a bottom surface of a frame 118 of the motor. Four spacers each having a height of 8 mm have been disposed on the bottom surface of the frame 118. FIG. 22 shows a top surface of the frame 118 of the motor. An outer ring 117 that corresponds to the inner ring 116 has been secured on the top surface of the frame 118. The outer ring 117 is a yoke made of soft iron and has a regular 18-sided polygonal shape. The height of the outer ring 117, the inner diameter thereof, and the outer diameter thereof are 16, around 59 mm, and 67 mm, respectively. Magnets are disposed inside the outer ring 117. FIG. 23 shows a side surface of the frame 118 and the outer ring 117 that have been secured. FIG. 24 shows an assembly of the bearing 115, the inner ring 116, the outer ring 117, and the frame 118.

Figure 25:
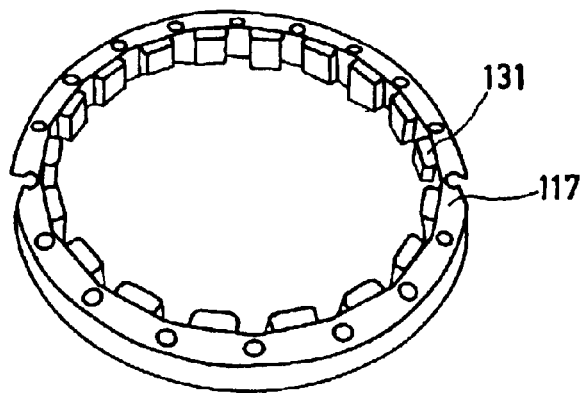
FIG. 25 is an external view showing a part that composes the motor according to the present invention.
Figure 26:
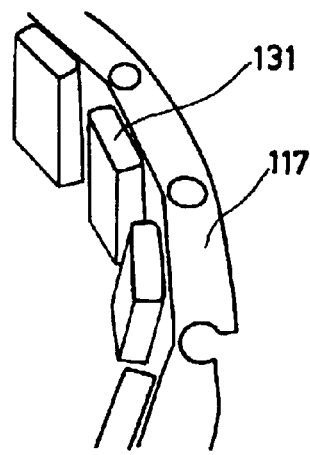
FIG. 26 is an external view showing a part that composes the motor according to the present invention.
Figure 27:
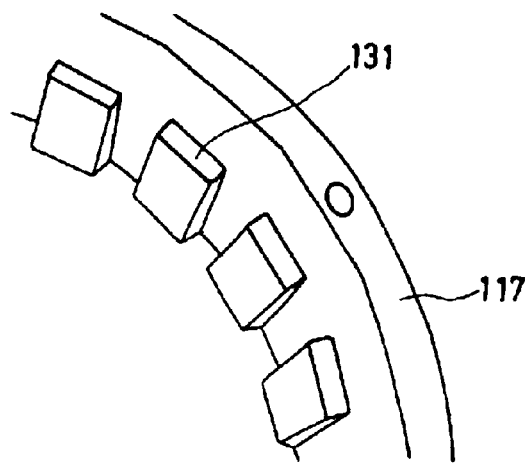
FIG. 27 is an external view showing a part that composes the motor according to the present invention.
Figure 28:
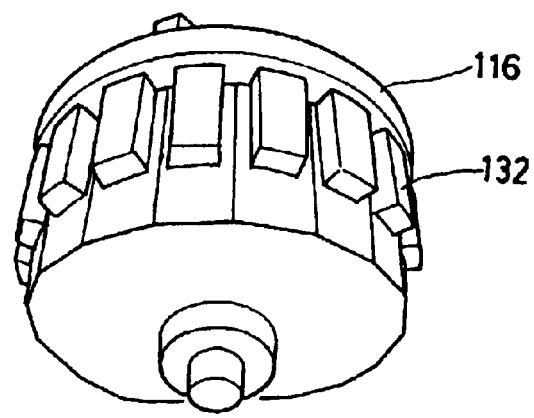
FIG. 28 is an external view showing a part that composes the motor according to the present invention.
Figure 29:
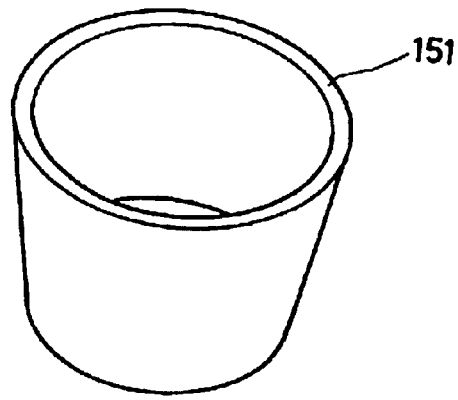
FIG. 29 is an external view showing a part that composes the motor according to the present invention.
Figure 30:
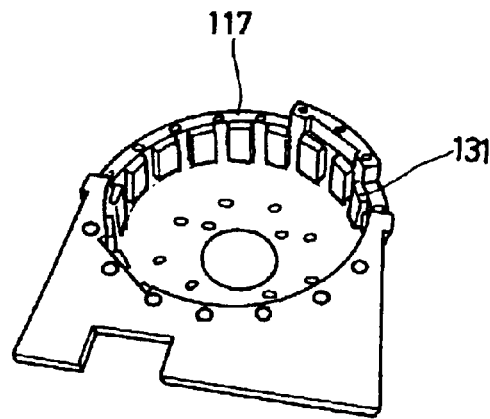
FIG. 30 is an external view showing a part that composes the motor according to the present invention.
Figure 31:
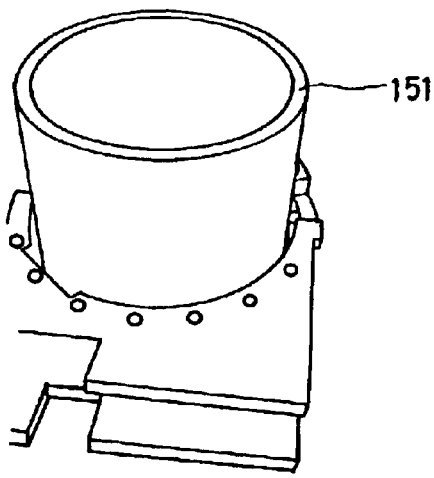
FIG. 31 is an external view showing a part that composes the motor according to the present invention.
Figure 32:
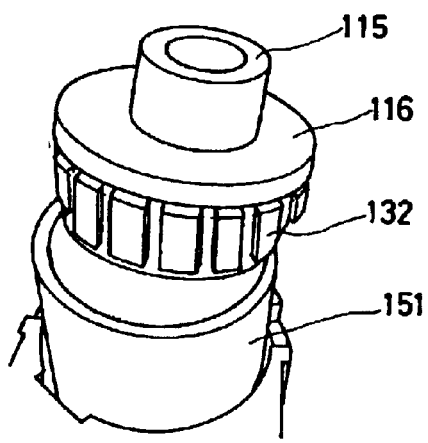
FIG. 32 is an external view showing a part that composes the motor according to the present invention.
Figure 33:
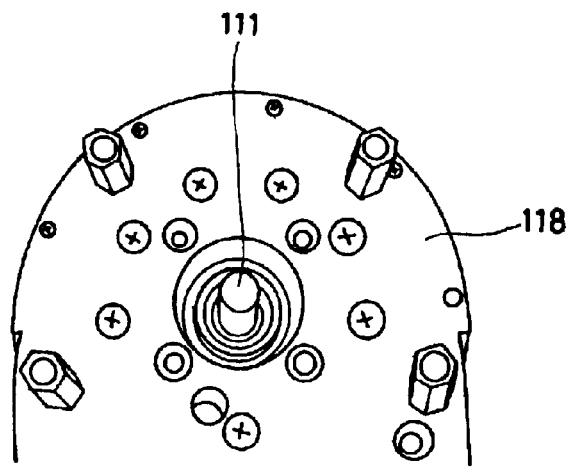
FIG. 33 is an external view showing a part that composes the motor according to the present invention.
Figure 34:
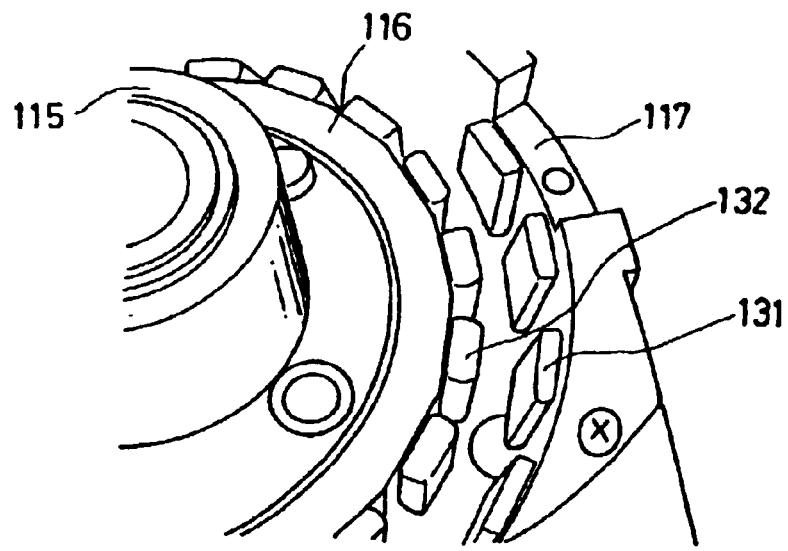
FIG. 34 is an external view showing a part that composes the motor according to the present invention.
Figure 35:
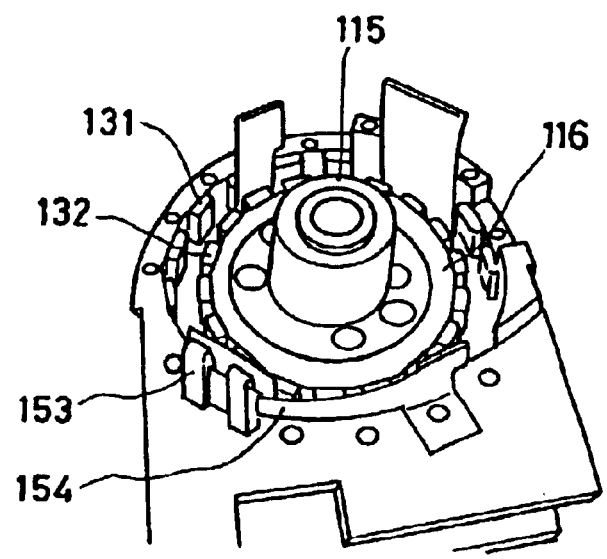
FIG. 35 is an external view showing a part that composes the motor according to the present invention.

FIG. 25, FIG. 26, and FIG. 27 show outer magnets 131 disposed inside the outer ring 117. The outer magnets 131 are made of neodyum. The thickness of each of the outer magnets 131, the width thereof, and the height thereof are for example 2.5 mm, 5 mm, and 10 mm, respectively. Each of the outer magnets 131 has been magnetized in the direction of the thickness thereof. The outer magnets 131 are arranged so that the N pole is adjacent to the S pole. FIG. 28 shows inner magnets 132 disposed outside the inner ring 116. The inner magnets 132 are made of neodyum. The thickness of each of the inner magnets 132, the width thereof, and the height thereof are for example 2.7 mm, 5 mm, and 10 mm, respectively. Each of the inner magnets 132 is magnetized in the direction of the thickness thereof. FIG. 29 shows a spacer jig 151. The inner diameter of the inner ring 151, the outer diameter thereof, and the height thereof are 47 mm, 54 mm, and 50 mm, respectively. The spacer jig 151 is inserted into the outer ring 117 in which the outer magnets 131 have been disposed as shown in FIG. 30. FIG. 31 shows the inner ring 151 that has been inserted into the outer ring 117. As shown in FIG. 32, the assembly of the magnets 132, the inner ring 116, and the bearing 115 are inserted into the spacer jig 151 that has been inserted into the outer ring 117 so that the phase of the outer ring 117 matches the phase of the inner ring 116. The phases are matched in such a manner that mounting holes of the outer ring 117 match mounting holes of the inner ring 116. FIG. 34 shows a gap of a magnetic circuit. FIG. 35 shows a flexible board 152, a connector board 153, and a flexible board support plate 154. The flexible board 152 has two pairs of 12 pins from which a power is supplied to the rotating portion. The connector board 153 has a connector.

Figure 36:
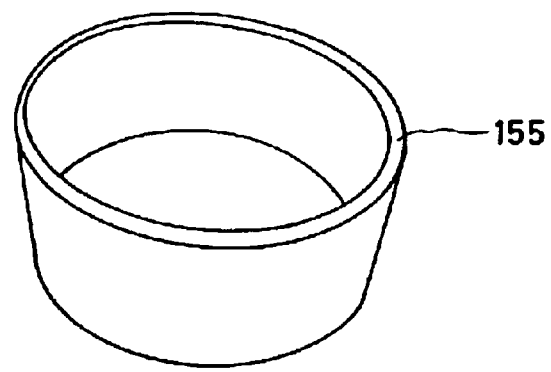
FIG. 36 is an external view showing a part that composes the motor according to the present invention.
Figure 37:
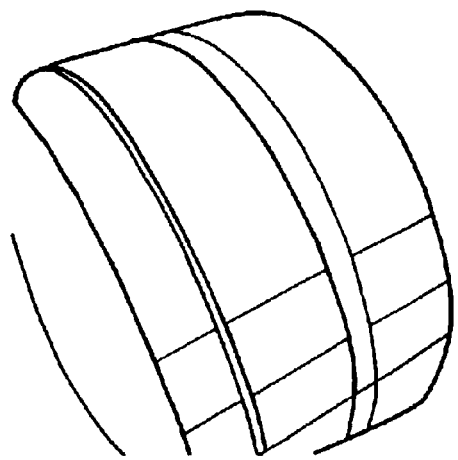
FIG. 37 is an external view showing a part that composes the motor according to the present invention.
Figure 38:
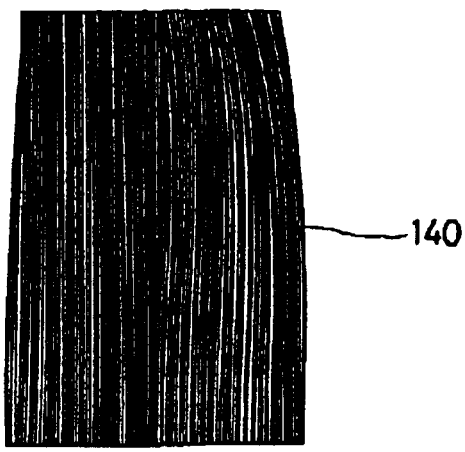
FIG. 38 is an external view showing a part that composes the motor according to the present invention.
Figure 39:
FIG. 39 is an external view showing a part that composes the motor according to the present invention.
Figure 40:
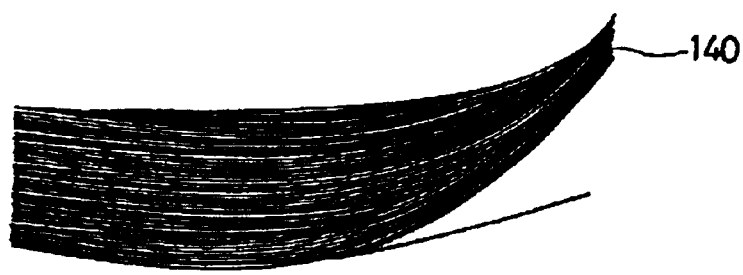
FIG. 40 is an external view showing a part that composes the motor according to the present invention.
Figure 41:
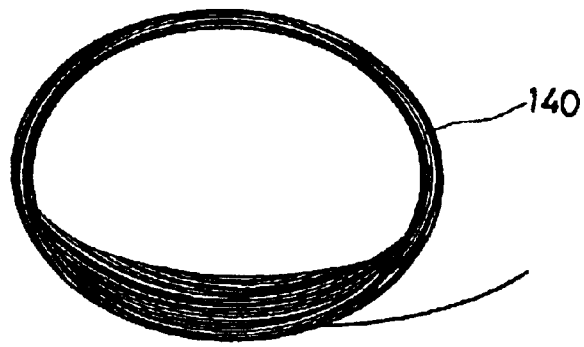
FIG. 41 is an external view showing a part that composes the motor according to the present invention.
Figure 42:
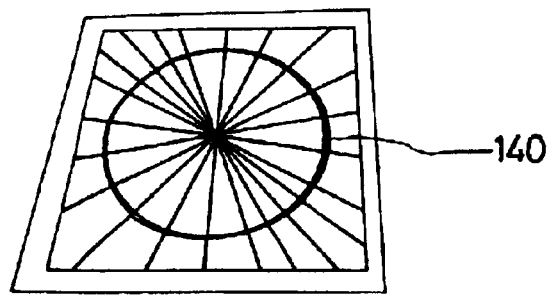
FIG. 42 is an external view showing a part that composes the motor according to the present invention.
Figure 43:
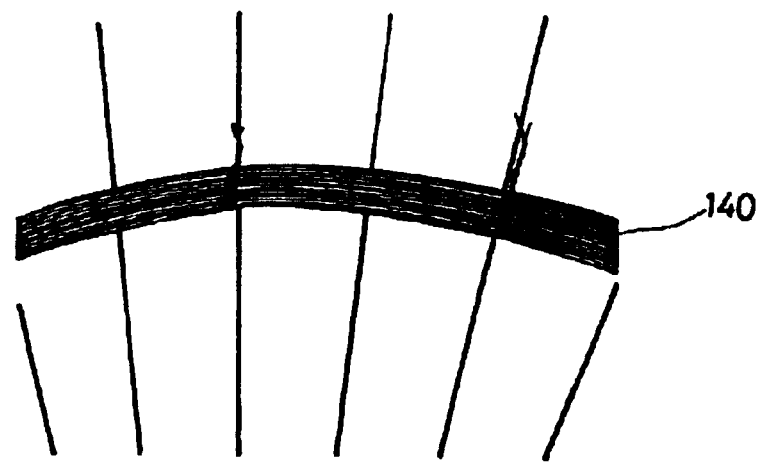
FIG. 43 is an external view showing a part that composes the motor according to the present invention.
Figure 44:
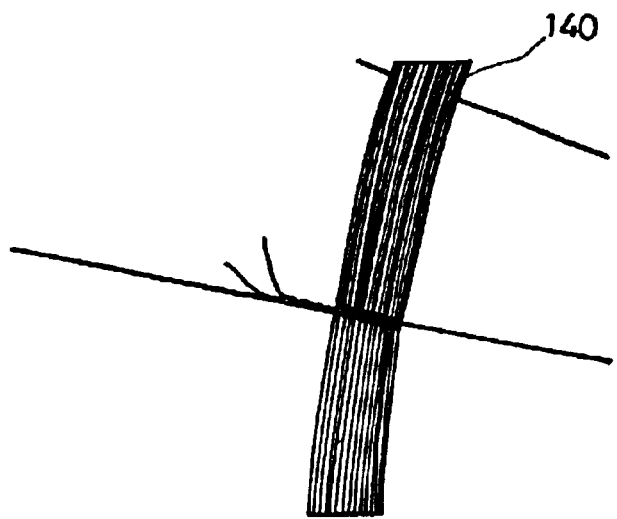
FIG. 44 is an external view showing a part that composes the motor according to the present invention.
Figure 45:
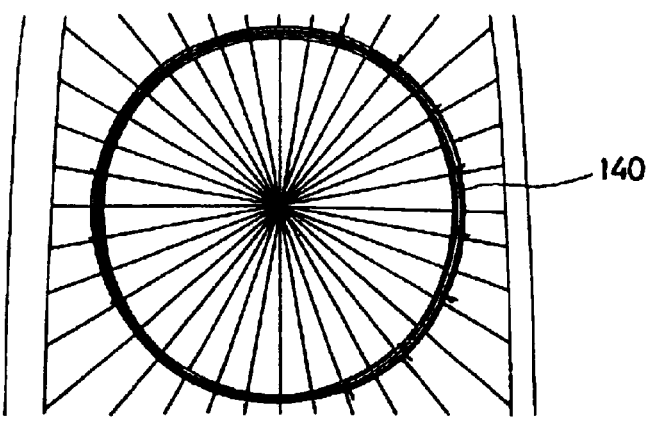
FIG. 45 is an external view showing a part that composes the motor according to the present invention.
Figure 46:
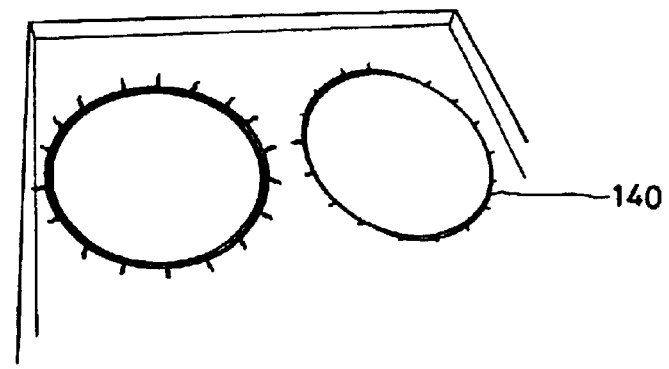
FIG. 46 is an external view showing a part that composes the motor according to the present invention.
Figure 47:
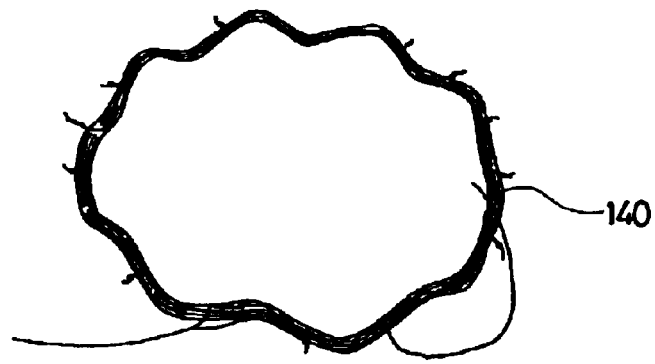
FIG. 47 is an external view showing a part that composes the motor according to the present invention.
Figure 48:
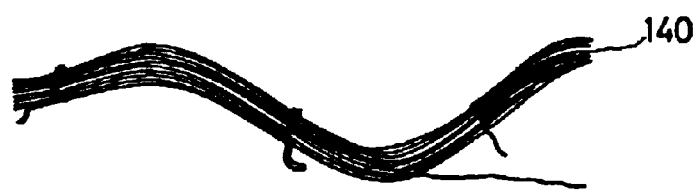
FIG. 48 is an external view showing a part that composes the motor according to the present invention.
Figure 49:
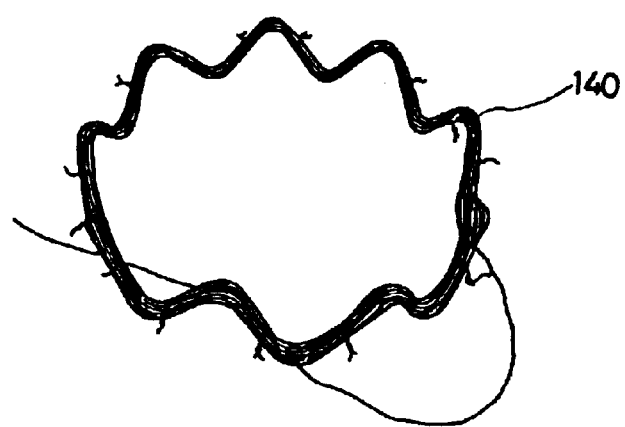
FIG. 49 is an external view showing a part that composes the motor according to the present invention.
Figure 50:
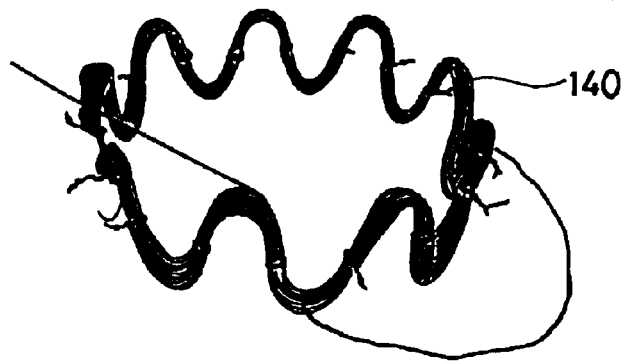
FIG. 50 is an external view showing a part that composes the motor according to the present invention.
Figure 51:
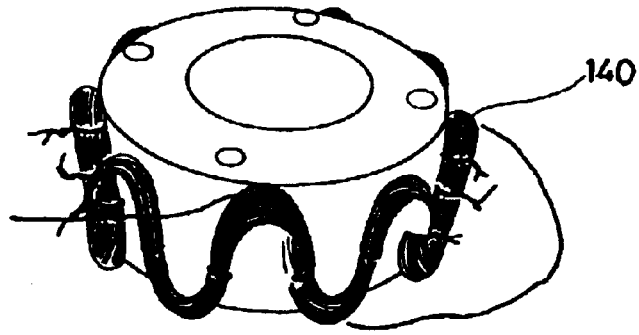
FIG. 51 is an external view showing a part that composes the motor according to the present invention.
Figure 52:
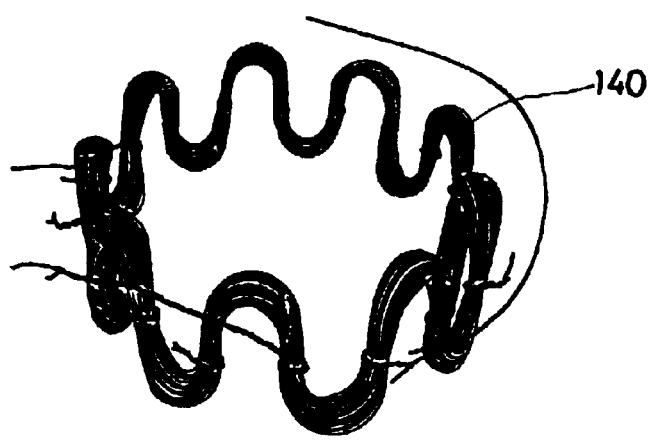
FIG. 52 is an external view showing a part that composes the motor according to the present invention.
Figure 53:
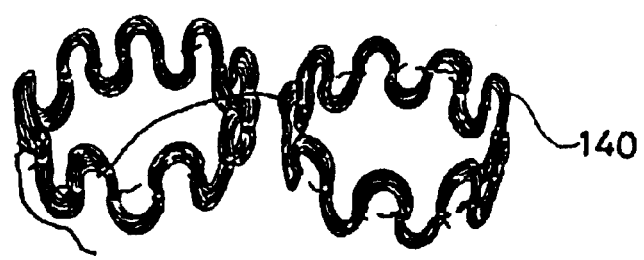
FIG. 53 is an external view showing a part that composes the motor according to the present invention.

Next, an example of a method for producing the coils of the pan motor will be described. First of all, a bobbin 155 as shown in FIG. 36 is prepared. The outer diameter of the bobbin 155 is 120 mm. A paper with lines that have been cut is wound around the bobbin 155. The paper on the bobbin 155 is bound by a rubber band as shown in FIG. 37. As shown in FIG. 38, a wire of φ0.23 is wound on the bobbin 155 through the paper for 69 turns. As a result, a coil 140 is formed. As shown in FIG. 39, FIG. 40, and FIG. 41, the coil 140 is carefully removed from the bobbin 155 through the paper. The coil 140 is bound at a plurality of positions with wires. A paper on which radial lines have been drawn at intervals of 20 degrees as shown in FIG. 42 is prepared. The bound coil 140 is placed on the paper so that the perfect circularity of the coil 140 is kept. Thereafter, as shown in FIG. 43, FIG. 44, and FIG. 45, the coil 140 is bound on the radial lines. At that point, a beginning lead and an end lead of the coil 140 are bound as one knot. As shown in FIG. 46, two coils 140 are produced. As shown in FIG. 47 and FIG. 48, the coils 140 are bent so that the knots are positioned at the centers of the straight portions. Thereafter, as shown in FIG. 49, FIG. 50, FIG. 51, and FIG. 52, each of the coils 140 is bent so that each bending angle becomes more sharply and then the straight portions are paralleled. As a result, as shown in FIG. 53, two waved coils 140 are formed.

Figure 54:
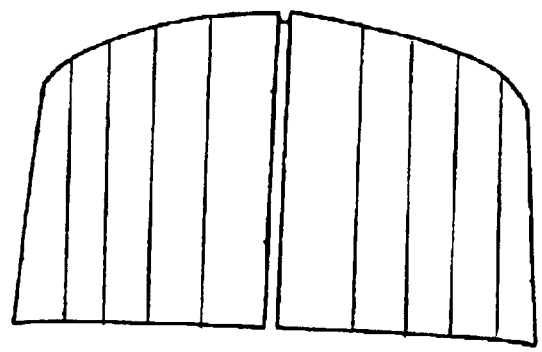
FIG. 54 is an external view showing a part that composes the motor according to the present invention.
Figure 55:
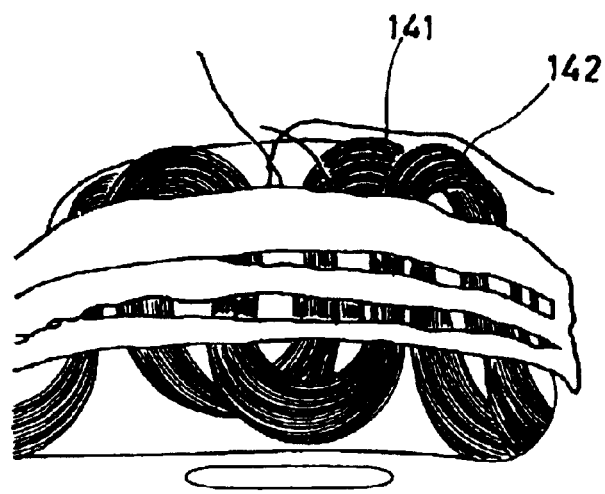
FIG. 55 is an external view showing a part that composes the motor according to the present invention.

As shown in FIG. 54, a section paper of 147 mm×20 mm that is divided into 36 portions by lines is prepared. The section paper is wound on a cylindrical jig having an outer diameter of 46.6 mm. Three 20-mm wide OHP sheets are wound on the scales of the section paper. As shown in FIG. 55, the two waved coils 140 are positioned on the section paper so that they ate shifted by 10 degrees. The inner coil 141 and the outer coil 142 have phase A and phase B, respectively. Thereafter, the 36 knots are removed from the coils 141 and 142 with a care so that the coatings of the coils 141 and 142 are not damaged. Thereafter, a POM rod 160 of 2.2×2.0×600 mm is prepared. From the rod 160, 9 7-mm long rod pieces and 27 5-mm long rod pieces are obtained. As a result, a total of 36 rod pieces 161 are prepared.

Figure 59:
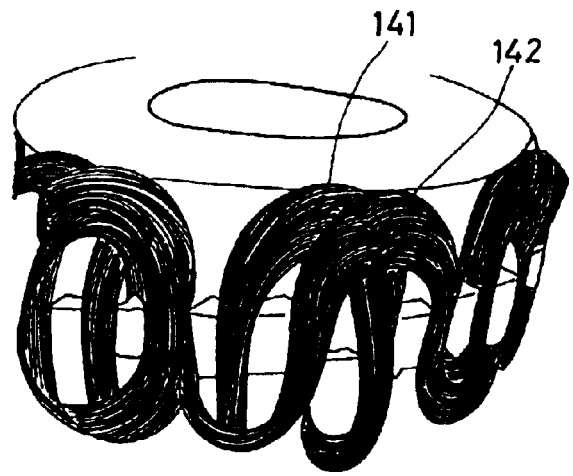
FIG. 59 is an external view showing a part that composes the motor according to the present invention.
Figure 60:
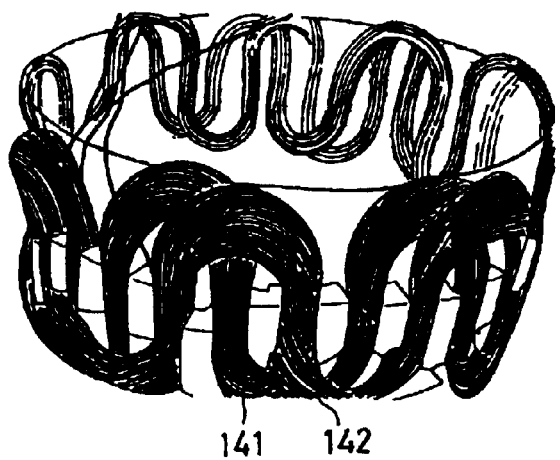
FIG. 60 is an external view showing a part that composes the motor according to the present invention.
Figure 61:
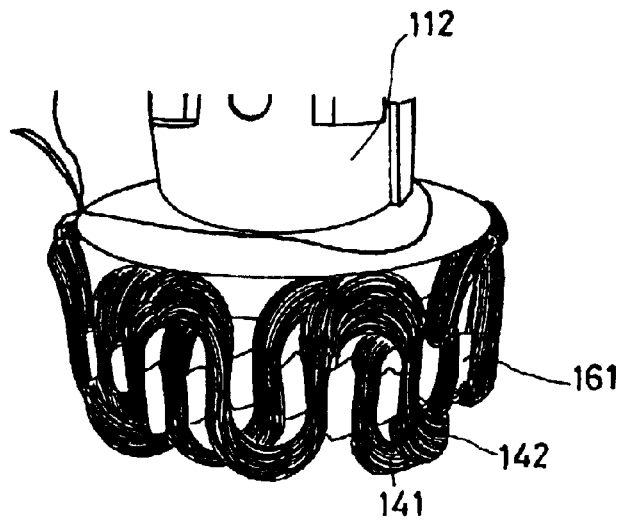
FIG. 61 is an external view showing a part that composes the motor according to the present invention.

As shown in FIG. 58, FIG. 59, and FIG. 60, the 36 rod pieces 161 are positioned in gaps formed between the coils 141 and 142. In other words, with the rod pieces 161, the coils 141 and 142 are apart each other by 2.0 mm. In the state, the coils 141 and 142 are tightly bound by a string or the like. Non-bound portions of the coils 141 and 142 are secured by adhesive agent. After the adhesive agent is solidified, the bound portions of the coils 141 and 142 are also secured by adhesive agent. Before these portions become sold, the strings are carefully removed. Thereafter, the adhesive agent is applied to these portions. Before the adhesive agent is solidified, the coils 141 and 142 are removed from the cylindrical jig. At that point, the coils 141 and 142 is accompanied by one OHP sheet. Before the coils 141 and 142 are secured, the OHP sheet is also removed therefrom. The resultant coils 141 and 142 are mounted on the aluminum rotor 112 and secured thereto by adhesive agent or the like.

Figure 62:
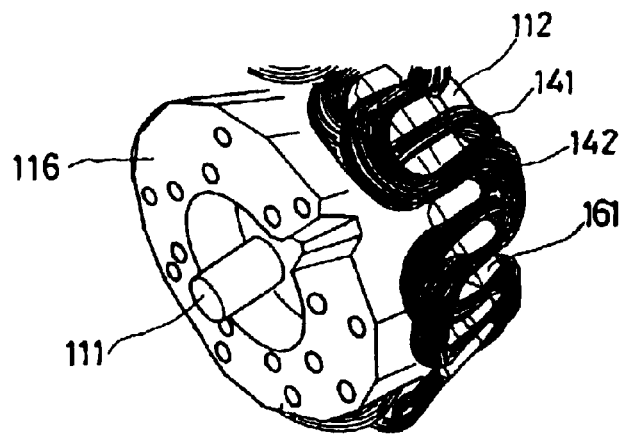
FIG. 62 is an external view showing a part that composes the motor according to the present invention.
Figure 63:
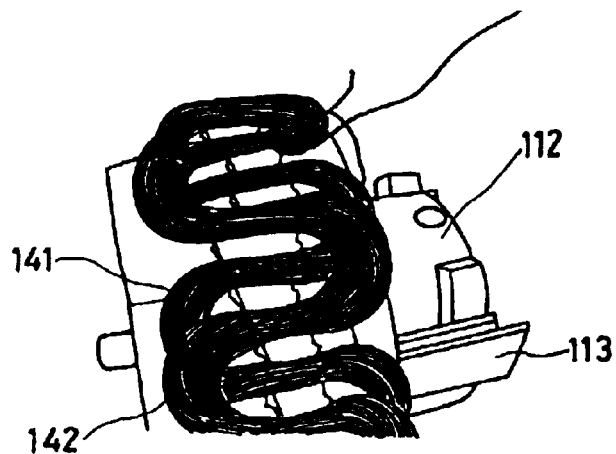
FIG. 63 is an external view showing a part that composes the motor according to the present invention.
Figure 64:
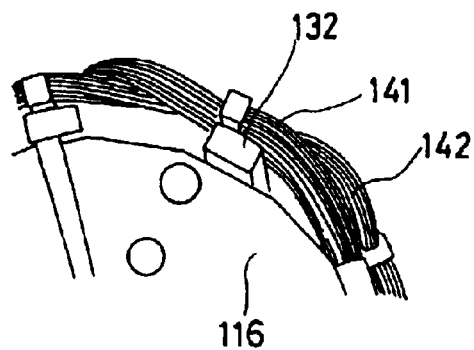
FIG. 64 is an external view showing a part that composes the motor according to the present invention.

As shown in FIG. 62, the rotor 112 to which the coils have been secured is inserted into the inner ring 116 so that the inner ring 116 is smoothly rotated in the coils. As shown in FIG. 63, the lower portions of the coils 141 and 142 secured to the rotor 112 protrude from the bottom surface of the inner ring 116 by around 1.5 mm. FIG. 64 shows a gap formed among one of the inner magnets 132 disposed on the inner ring 116 and the coils 141 and 142 secured on the rotor 112.

Figure 65:
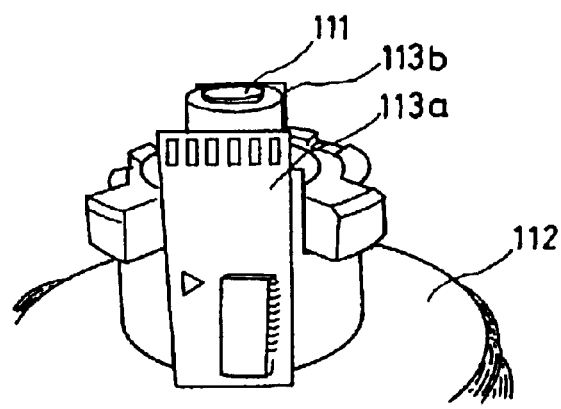
FIG. 65 is an external view showing a part that composes the motor according to the present invention.
Figure 66:
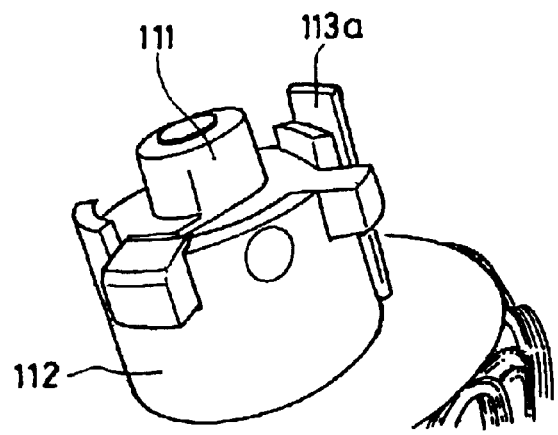
FIG. 66 is an external view showing a part that composes the motor according to the present invention.
Figure 67:
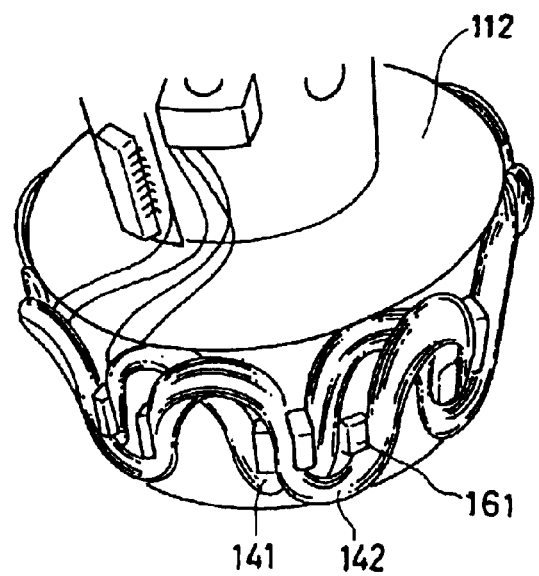
FIG. 67 is an external view showing a part that composes the motor according to the present invention.
Figure 68:
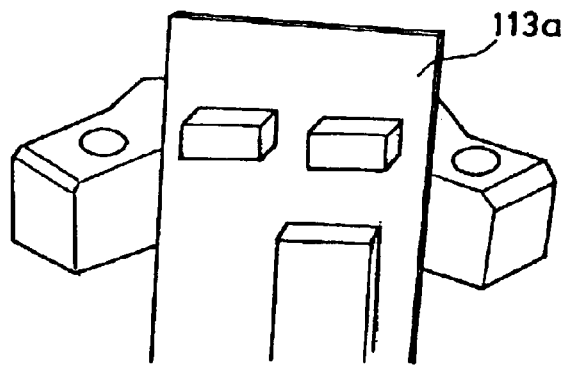
FIG. 68 is an external view showing a part that composes the motor according to the present invention.
Figure 69:
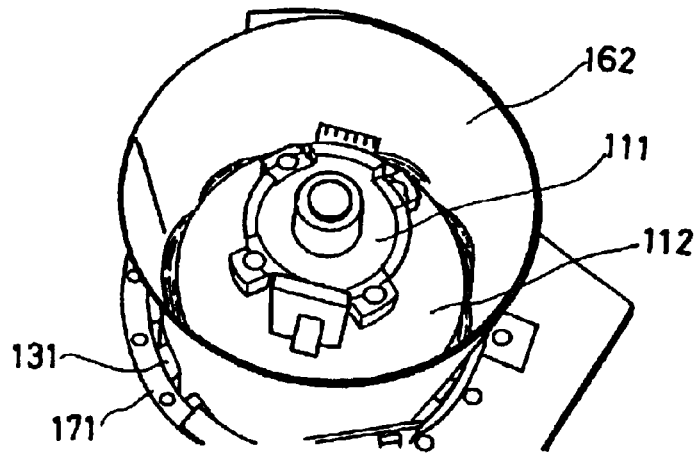
FIG. 69 is an external view showing a part that composes the motor according to the present invention.
Figure 70:
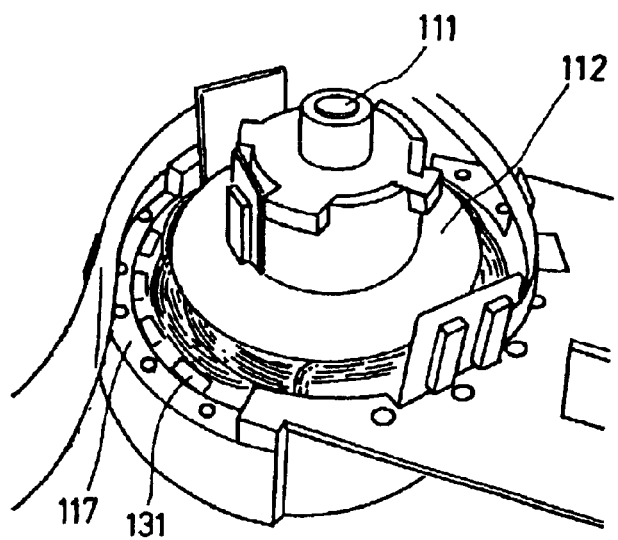
FIG. 70 is an external view showing a part that composes the motor according to the present invention.
Figure 71:
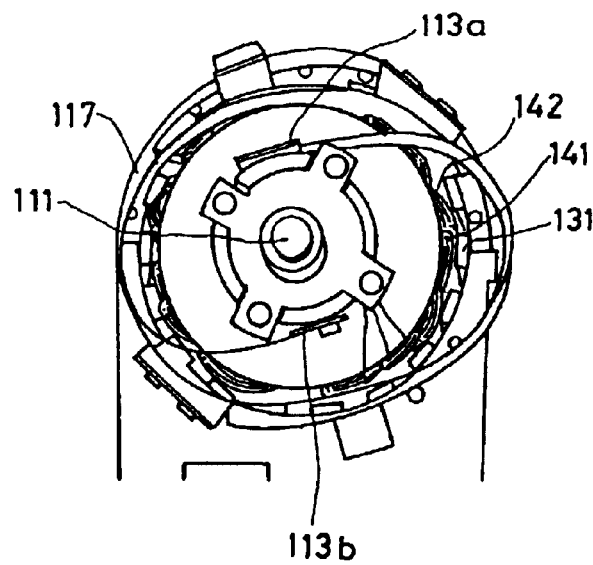
FIG. 71 is an external view showing a part that composes the motor according to the present invention.
Figure 72:
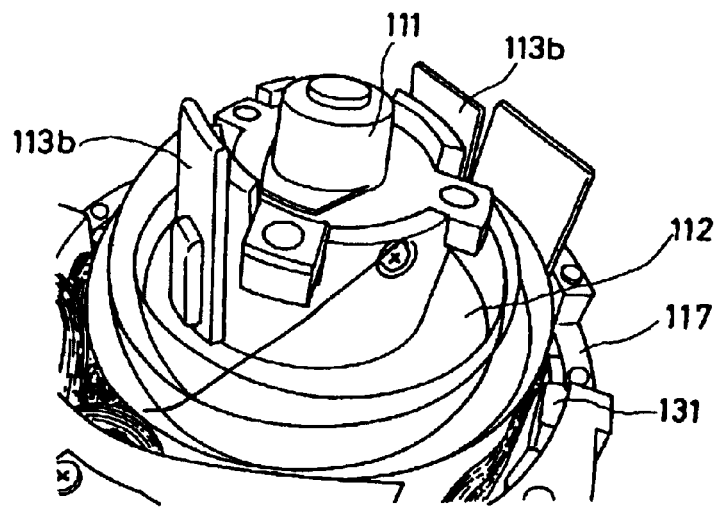
FIG. 72 is an external view showing a part that composes the motor according to the present invention.
Figure 73:
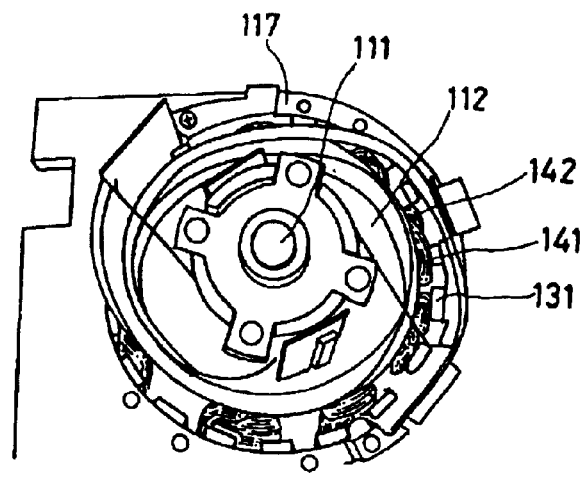
FIG. 73 is an external view showing a part that composes the motor according to the present invention.

FIG. 65 shows a board 113 disposed on the rotating side. The board 113 has a connector connected to the flexible board. The board 113 is secured to a brass portion of the shaft 111 with machine screws. The brass portion is cramped to the shaft 111. As shown in FIG. 66, two boards 113a and 113b are disposed oppositely with an angle of 180 degrees for a vertical block and coils, respectively. As shown in FIG. 67, the leads of the coils 141 and 142 are run on the aluminum rotor 112 and secured by adhesive agent. As shown in FIG. 68, a board 113a is disposed. A first lead (not shown) of the coil 141 is connected to pins 1, 2, and 3 of the connector of the board 113a. A second lead (not shown) of the coil 141 is connected to pins 4, 5, and 6 of the connector of the board 113a. A first lead (not shown) of the coil 142 is connected to pins 7, 8, and 9 of the connector of the board 113b. A second lead (not shown) of the coil 142 is connected to pins 10, 11, and 12 of the connector of the board 113b. Thereafter, a spacer 162 made of paper or the like is formed. As shown in FIG. 69, the inner ring 116 is inserted into the outer ring 117 so that the phases of the magnets 131 match the phases of the magnets 132. As was described above, when the phases of the magnets 131 match the phases of the magnets 132, mounting holes of the outer ring 117 match mounting holes of the inner ring 116. In addition, as shown in FIG. 70, the rotor 112 is smoothly rotated. As shown in FIG. 71. FIG. 72, and 73, the two flexible boards are connected to the respective connectors. The two machine screws of the rotor 112 are loosened and the two needle shaped springs are secured.

Figure 74:
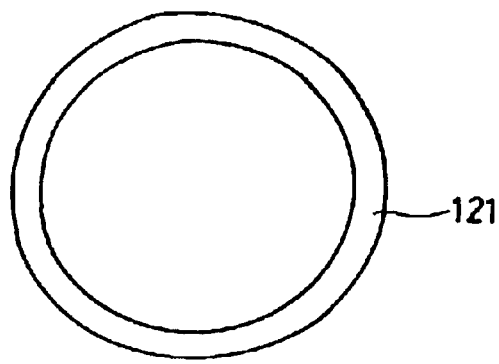
FIG. 74 is an external view showing a part that composes the motor according to the present invention.
Figure 75:
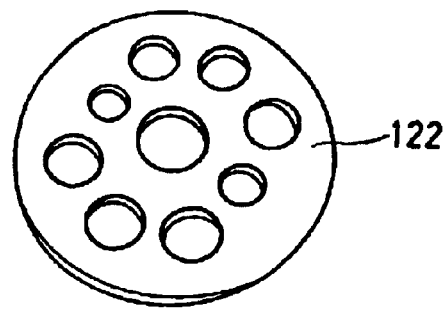
FIG. 75 is an external view showing a part that composes the motor according to the present invention.
Figure 76:
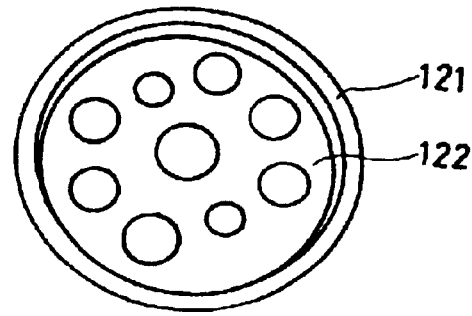
FIG. 76 is an external view showing a part that composes the motor according to the present invention.
Figure 77:
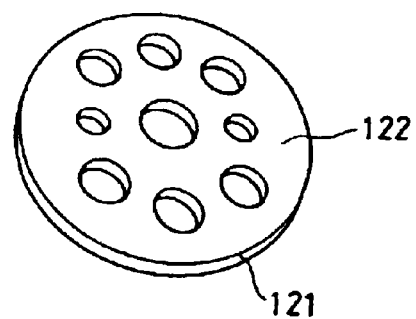
FIG. 77 is an external view showing a part that composes the motor according to the present invention.
Figure 78:
FIG. 78 is an external view showing a part that composes the motor according to the present invention.
Figure 79:
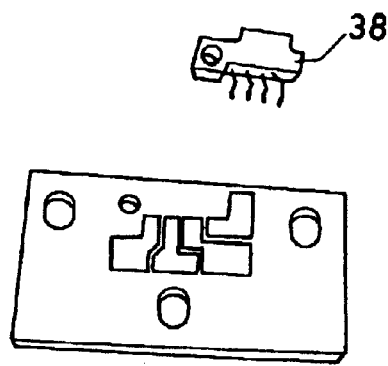
FIG. 79 is an external view showing a part that composes the motor according to the present invention.
Figure 80:
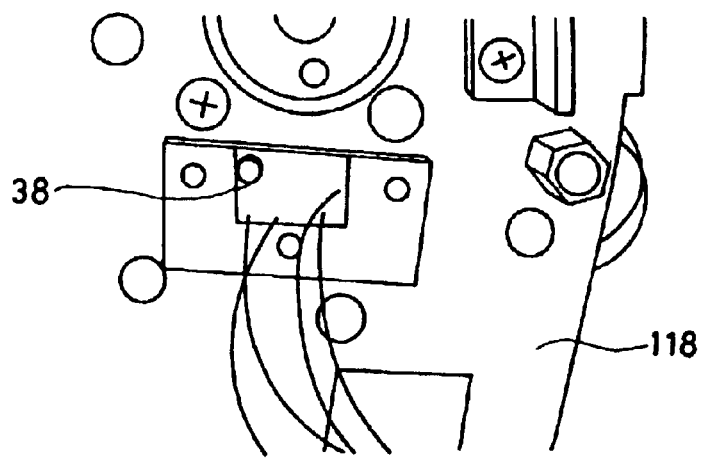
FIG. 80 is an external view showing a part that composes the motor according to the present invention.

FIG. 74 shows a magnetic ring 121 removed from the rotor 112. FIG. 75 shows an aluminum disc 122 that secures the magnetic ring 121. FIG. 76 shows the aluminum disc 122 and the magnetic ring 121 that have been secured by adhesive agent. FIG. 77 shows the rear of the assembly of the aluminum disc 122 and the magnetic ring 121 shown in FIG. 76. FIG. 78 shows an appearance of the two-phase MR sensor 38. FIG. 79 shows the two-phase MR sensor 38 and a board therefor. FIG. 80 shows the board on which the two-phase MR sensor 38 has been mounted and an L-shaped metal member that secures the photo interrupter that detects the front position.

Figure 81:
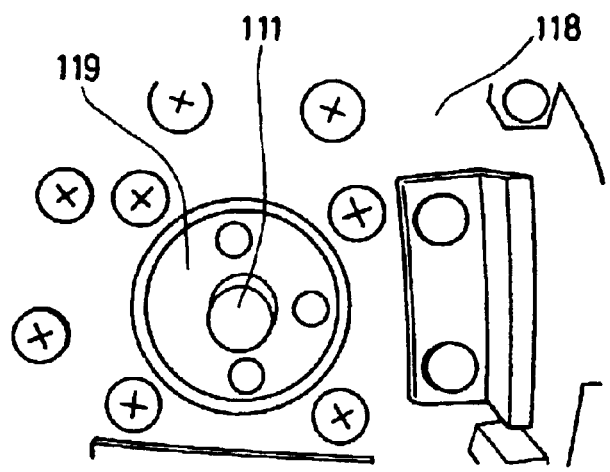
FIG. 81 is an external view showing a part that composes the motor according to the present invention.
Figure 82:
FIG. 82 is an external view showing a part that composes the motor according to the present invention.
Figure 83:
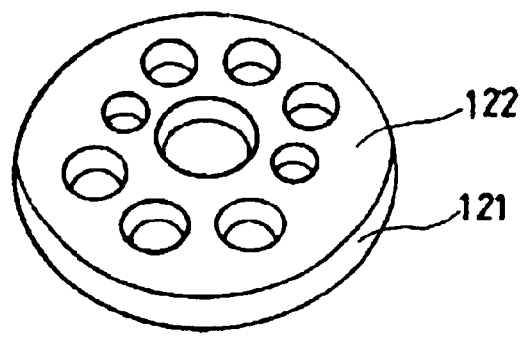
FIG. 83 is an external view showing a part that composes the motor according to the present invention.
Figure 84:
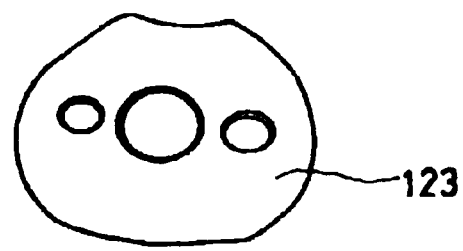
FIG. 84 is an external view showing a part that composes the motor according to the present invention.
Figure 85:
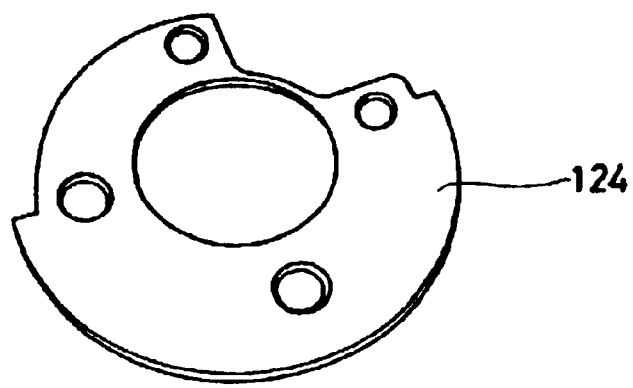
FIG. 85 is an external view showing a part that composes the motor according to the present invention.
Figure 86:
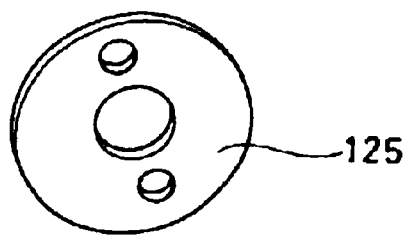
FIG. 86 is an external view showing a part that composes the motor according to the present invention.

FIG. 81 shows a brass ring 119 disposed below the shaft 111. The aluminum disc 122 (FIG. 83) to which the magnetic ring 121 has been adhered is positioned on the brass ring 119 through an aluminum sleeve 120 (FIG. 82) having a thickness of 4 mm. Thereafter, a polycarbonate sheet 123 (FIG. 84) having a thickness of 0.25 mm is positioned on the aluminum disc 122. Thereafter, a 180-degree light insulating plate 123 (FIG. 85) made of a polycarbonate sheet and having a thickness of 0.25 mm is positioned on the polycarbonate sheet 123. Thereafter, a polycarbonate sheet 125 (FIG. 86) having a thickness of 0.5 mm is positioned on the polycarbonate sheet 123 and then. those sheets that have been successively positioned are secured with machine screws.

Figure 87:
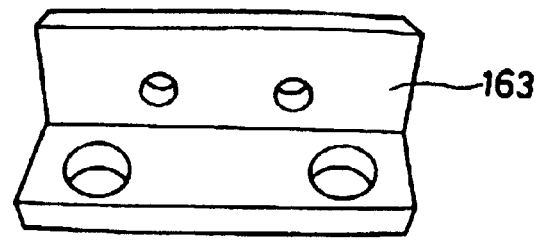
FIG. 87 is an external view showing a part that composes the motor according to the present invention.
Figure 88:
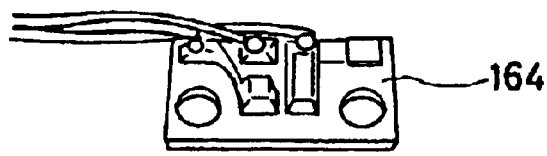
FIG. 88 is an external view showing a part that composes the motor according to the present invention.
Figure 89:
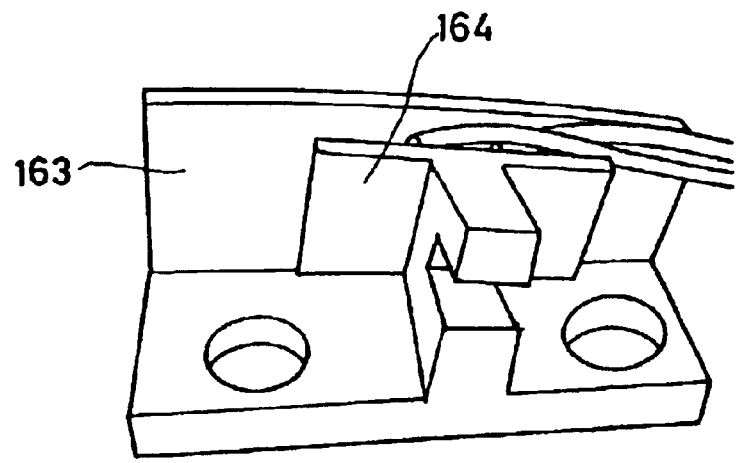
FIG. 89 is an external view showing a part that composes the motor according to the present invention.
Figure 90:
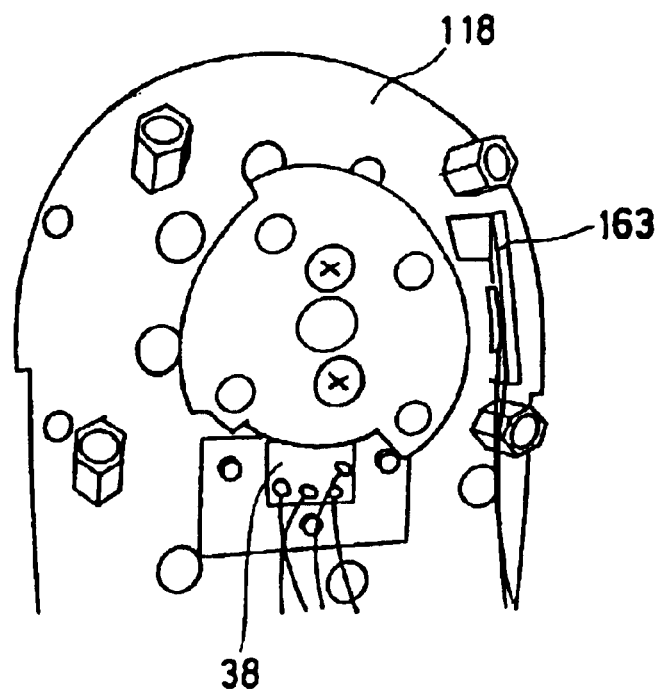
FIG. 90 is an external view showing a part that composes the motor according to the present invention.

FIG. 87 sows an L-shaped metal member 163 having a thickness of 1.4 mm. FIG. 88 shows a board 164, on which the photo interrupter 39 has been mounted, and polycarbonate sheets 165 with which the board 164 is mounted on the L-shaped metal member 163. FIG. 89 shows an assembly of the L-shaped metal member 163, the photo interrupter 39, and the board 164. FIG. 90 shows the assembly of the L-shaped metal member 163, the photo interrupter 39, and the board 164, the board 164 having been secured to the L-shaped metal member 163 with machine screws, the photo interrupter 39 having been mounted on the L-shaped metal member 163.

Figure 91:
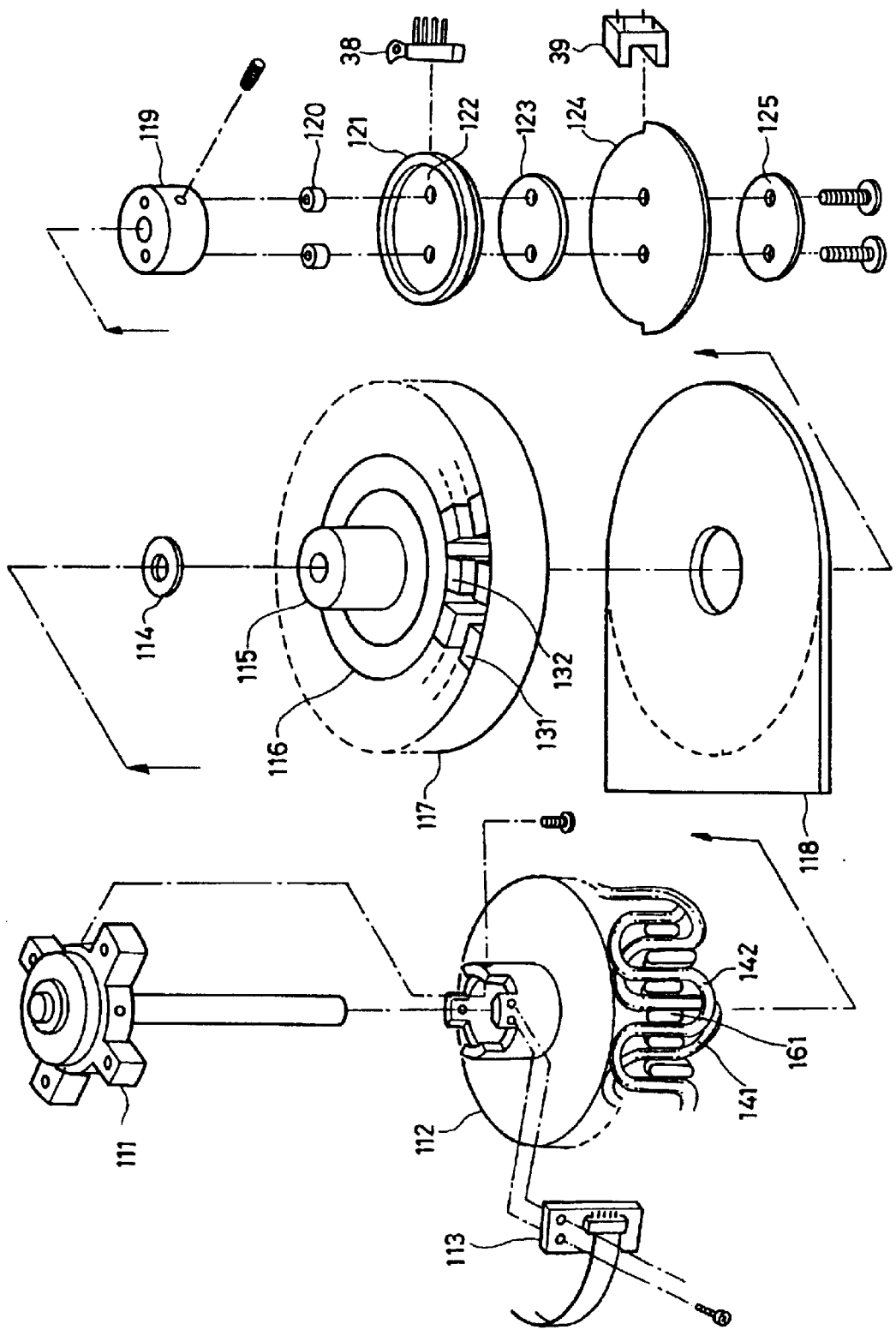
FIG. 91 is an exploded perspective view for explaining the motor according to the present invention.
Figure 92:
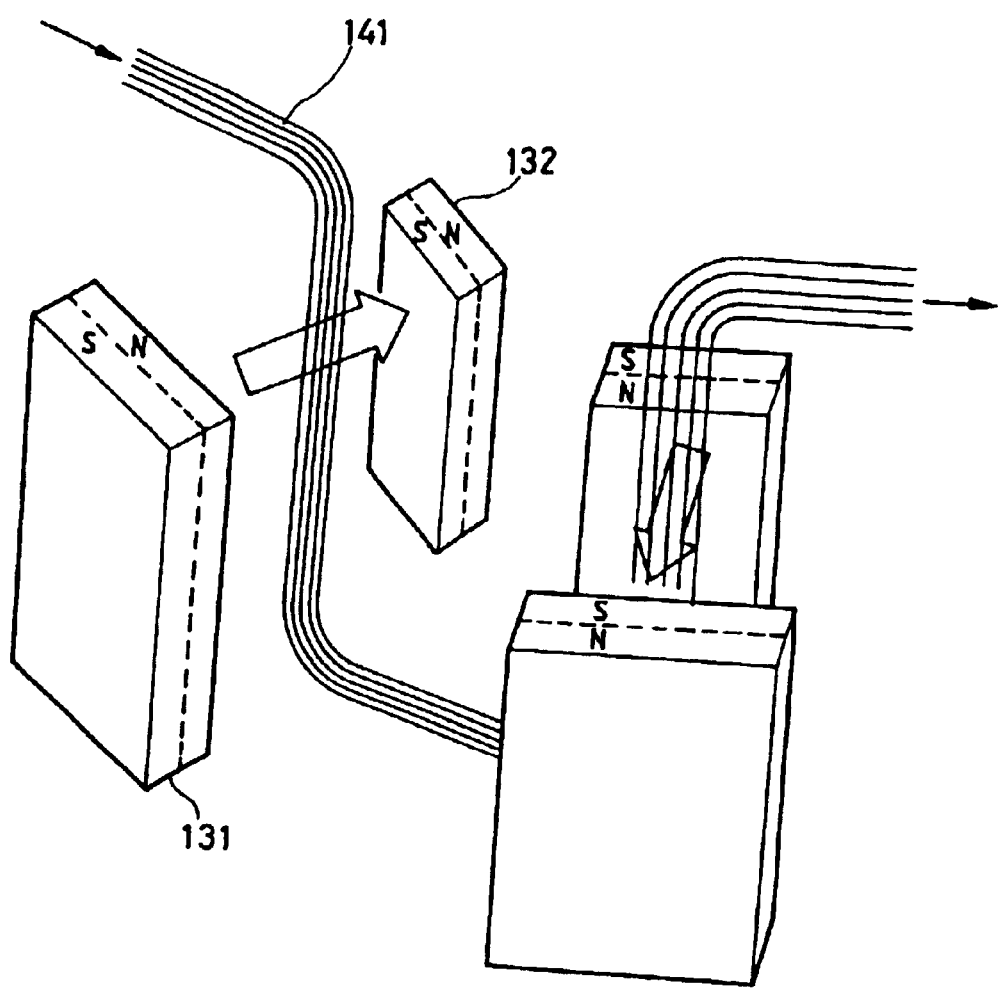
FIG. 92 is a schematic diagram for explaining the motor according to the present invention.

Next, with reference to an exploded perspective view of FIG. 91, the assembling method of the motor will be described. The shaft 111 is inserted into the rotor 112 and secured at four positions with four machine screws. The connector 113 of the rotating side flexible board is secured to the rotor 112 at two positions with two machine screws. Another connector 113' that is the same as the connector 113 is disposed opposite to the connector 113. An assembly of the bearing 115 and the inner ring 116 that have been secured is mounted to the shaft 111 through a flat washer 114. The outer ring 117, which corresponds to the inner ring 116, is secured to the frame 118 with machine screws. As shown in FIG. 92, the 18 magnets 131 are disposed and adhered on the outer ring 117. The 18 magnets 132 are disposed and adhered on the inner ring 116. The brass ring 119 is mounted on the shaft 111 and secured with a machine screw. The aluminum disc 122 on which the two 4-mm thick sleeves 120 and the magnetic ring 121 have been mounted, the polycarbonate sheet 123, the polycarbonate light insulating plate 124, and the polycarbonate sheet 125 are secured to the brass ring 119 with two machine screws. The two-phase MR sensor 38 is disposed in a predetermined relation with the magnetic ring 121. In addition, the photo interrupter 39 is disposed in a predetermined relation with the light insulating plate 124.

As shown in FIG. 92, since a magnetic field is generated between the magnets 131 and 132, a force is generated in the straight portion of the rectangular waved coil disposed therebetween in the circumferential direction. Thus, when the radius of each coil is increased and the number of poles is increased, a strong torque can be generated. Since the motor has a structure of which the coils are rotated, even if the magnetic circuit on the stator side becomes large, the mass of the rotor side is small. For simplicity, FIG. 92 shows only phase A of the inner coil 141.

When the coil 141 of phase A gets away from the magnetic field generated by the magnets 131 and 132, the coil 142 of phase B comes in the magnetic field. At that timing, when the phases are changed, the rotor can be continuously rotated. Since the motor does not have an iron core, a saturated state does not take place.

Figure 93A:
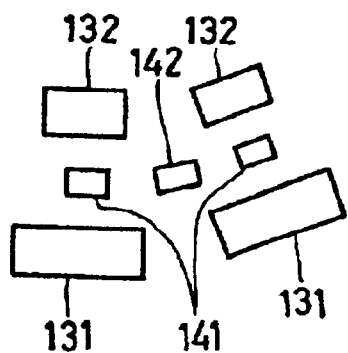
FIG. 93A and FIG. 93B are schematic diagrams for explaining the motor according to the present invention.
Figure 93B:
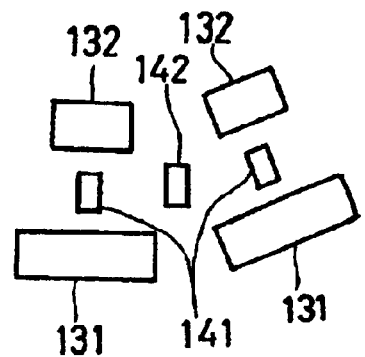

FIG. 93 shows sections of the coils 141 and 142 and outer magnets 131 and 132. The shapes of the sections of the coil 141 and the coil 142 shown in FIG. 93B allow a loss of a torque to be more reduced than the shapes of those shown in FIG. 93A. Although leads of the coils 141 and 142 may be extracted using a slip ring or the like, according to the embodiment, since the rotor is rotated by only 240 degrees, the forgoing flexible board is used.

Figure 94:
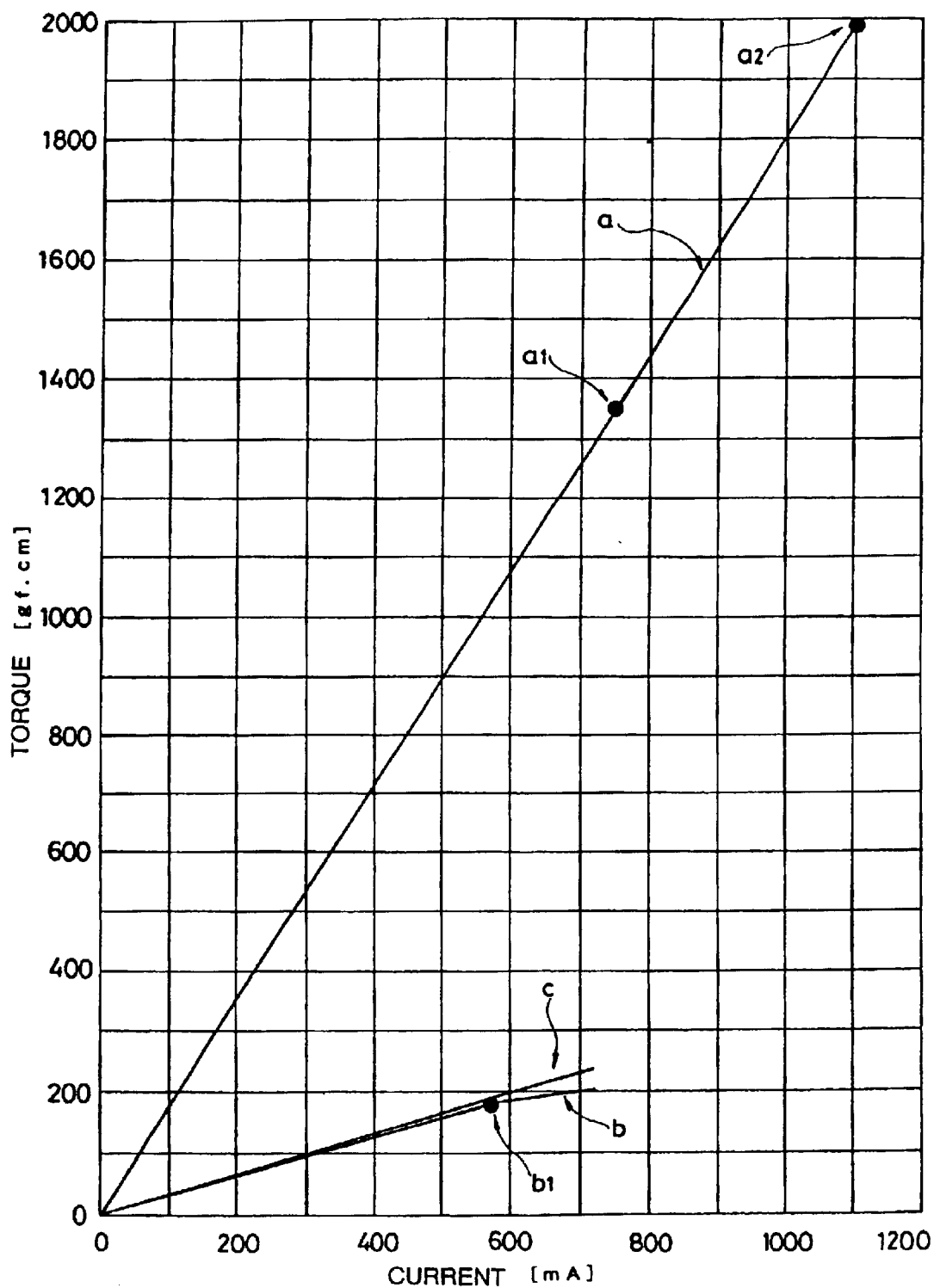
FIG. 94 is a characteristic diagram for explaining the motor according to the present invention.

Next, with reference to FIG. 94, characteristics of a start torque of the motor according to the embodiment will be described. In FIG. 94, the characteristic of the start torque of the motor according to the embodiment is denoted by characteristic a. A start torque of a motor used in a drum of a conventional VHS VCR is denoted by characteristic b and an ideal characteristic thereof is denoted by characteristic c. The impedance of the motor according to the embodiment is around 12.7Ω, whereas the impedance of the motor used in the drum of the VHS VCR is around 22Ω.

Now, it is assumed that they are compared with the same power consumption of around 7.1 W. The characteristic a represents that when the voltage and current at point a1 are 9.5 V and 750 mA, respectively, the start torque is 1350 [gfcm]. The characteristic b represents that when the voltage and current at point b1 are 12.5 V and 570 mA, respectively, the start torque is 180 [gfcm]. Thus, when they are compared with the same power, the start torque of the motor according to the embodiment is around 7.5 times higher than that of the motor used in the drum of the VHS VCR.

Next, it is assumed that they are compared with the same voltage of 12.5 V. The characteristic a represents that when the current is 980 mA, the start torque is 1780 [gfcm]. The characteristic b represents that when the current is 570 mA, the start torque is 180 [gfcm]. Thus, when they are compared with the same voltage, the start torque of the motor according to the embodiment is around 9.8 times higher than that of the motor used in the drum of the VHS VCR.

In addition, with the maximum drive power of the characteristic a, namely, 14 V, 1.1 A, and 15.4 W, the maximum torque of 1990 [gfcm] can be obtained.

Figure 95:
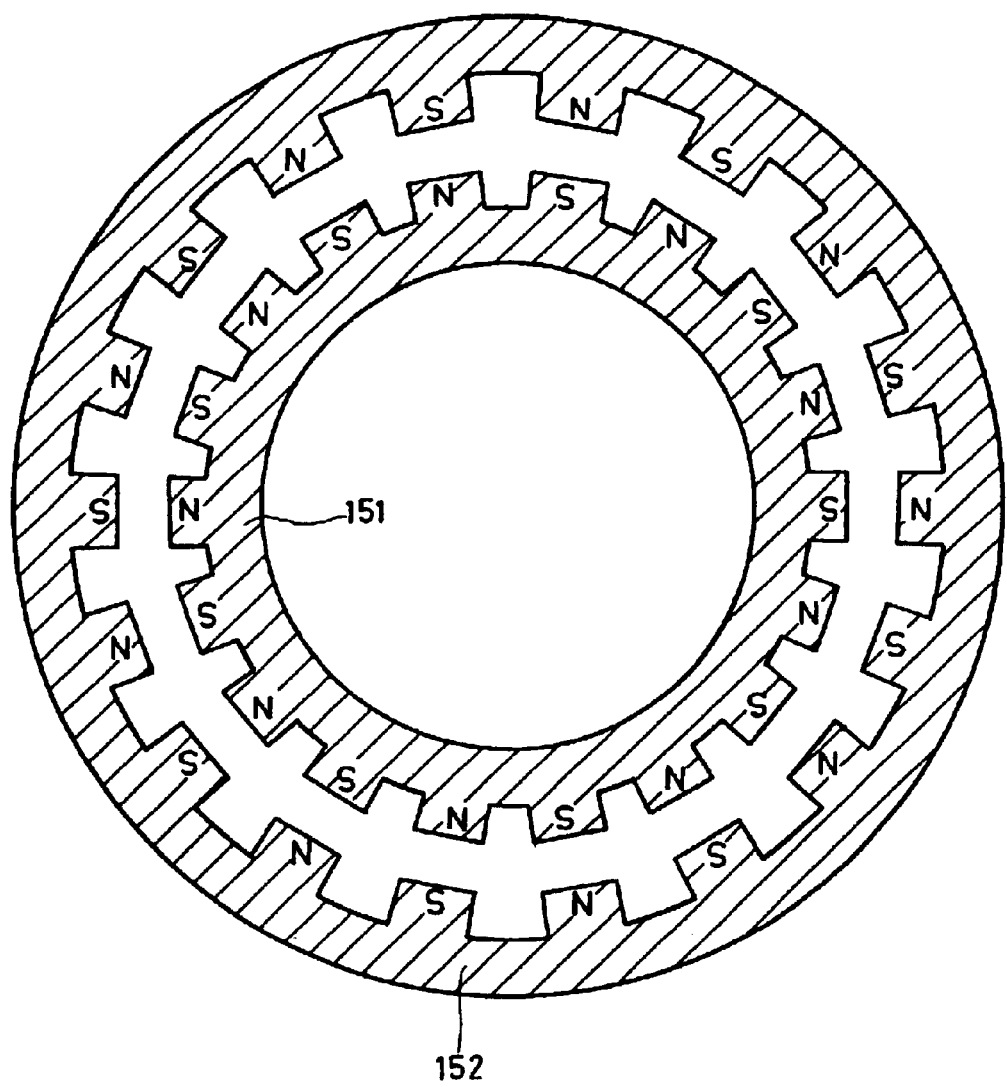
FIG. 95 is a sectional view for explaining the motor according to the present invention.

Next, with reference to FIG. 95, another example of a motor having the same magnetic circuit as the motor according to the embodiment will be described. The inner ring 151 and the outer ring 152 are made of for example ferrite cores as shown in FIG. 95. The peripheral surfaces of the inner ring 151 and the outer ring 152 are magnetized as N poles and S poles as shown in FIG. 95. The motor composed of the inner ring 151 and outer ring 152 that have been magnetized in such a manner has the same magnetic circuit as the motor composed of the inner ring and the outer ring on which 18 magnets each have been secured.

Alternatively, one of the inner ring and the outer ring may be made of a ferrite core, whereas the other may be made of soft iron. Such a motor can have the same magnetic circuit as the motor composed of the inner ring and the outer ring on which 18 magnets each have been disposed.

According to the embodiment, the outer magnets 131 and the inner magnets 132 are made of for example neodyum. However, it should be noted that the material of the outer magnets 131 and the inner magnets 132 is not limited to neodyum. In other words, as long as magnets can be formed, any material can be used.

According to the embodiment, the motor is used as a pan motor so that it can be moved to a target angle at high speed. However, the motor may be moved in the linear direction at high speed. In other words, the use of the motor is not limited to a rotating system.

According to the embodiment, the motor used for a pan motor is a two-phase motor. Alternatively, a three-phase motor can be used without any disadvantages. When the motor is a two-phase motor, two coils are disposed with a shift of (180/18) degrees=10 degrees. When the motor is a three-phase motor, three coils are disposed with a shift of (120/18) degrees=around 6.7 degrees.

According to the present invention, with such a simple structure, a position can be detected in an accuracy of 0.1 degree or below.

In addition, according to the present invention, while the maximum acceleration/deceleration method for moving the motor for a particular distance in the shorted time period is used, an error between a preset model curve and a measured real curve is obtained and reversely fed back. Thus, while the motor is being accelerated or decelerated, the servo is performed so that the position and velocity of the motor do not deviate from the preset curve. As a result, a servo system that is not affected by the fluctuation of the load can be accomplished.

In addition, with the same power consumption, the motor according to the present invention can output a start torque that is 10 times higher than that of a motor used in a drum of a VHS VCR. In addition, since the mass of the rotor is small, it can be moved at high speed.

What is claimed is:

1. An angle or position detecting apparatus, comprising:
   an actuator composed of a coil and a magnet;
   a mechanism for performing a rotating operation or a reciprocal operation;
   a sensor for detecting the angle or position of the actuator and outputting a first sine wave and a second sine wave that are shifted by 90 degrees each other;
   a counter for storing the current angle or the current position;
   a memory for outputting a third sine wave and a fourth sine wave that are shifted by 90 degrees each other corresponding to an output of the counter;
   a first multiplying device for multiplying the first sine wave by the third sine wave;
   a second multiplying device for multiplying the second sine wave by the fourth sine wave;
   a subtracting device for subtracting a signal that is output from the first multiplying device from a signal that is output from the second multiplying device; and
   operation amplifying means for amplifying signal that is output from the subtracting device,
   wherein the current angle or the current position of the counter is increased or decreased corresponding to an output of the operational amplifying means and the increased or decreased angle or position is output as the current angle or current position.

2. The angle or position detecting apparatus as set forth in claim 1,
   wherein the mechanism for performing the rotating operation or reciprocal operation has:
      an optical axis varying device for varying the direction of an optical axis in at least the vertical direction.

3. The angle or position detecting apparatus as set forth in claim 1,
   wherein the operational amplifying means is a zero cross comparator.

4. The angle or position detecting apparatus as set forth in claim 2,
   wherein the operational amplifying means is a zero cross comparator.

5. An angle or position detecting method, comprising the steps of:
   causing an actuator composed of a coil and a magnet to perform a rotating operation or a reciprocal operation;
   detecting the angle or position of the actuator and outputting a first sine wave and a second sine wave that are shifted by 90 degrees each other;
   storing the current angle or the current position;
   outputting a third sine wave and a fourth sine wave that are shifted by 90 degrees each other corresponding to the current angle or the current position that has been stored;
   causing a first multiplying device to multiply the first sine wave by the third sine wave;
   causing a second multiplying device to multiply the second sine wave by the fourth sine wave;
   causing a subtracting device to subtract a signal that is output from the first multiplying device from a signal that is output from the second multiplying device;
   causing operation amplifying means to amplify a signal that is output from the subtracting device; and
   increasing or decreasing the current angle or the current position corresponding to an output of the operational amplifying means and outputting the increased or decreased angle or position as the current angle or current position.

6. The angle or position detecting method as set forth in claim 5,
   wherein the mechanism for performing the rotating operation or reciprocal operation has:
      an optical axis varying device for varying the direction of an optical axis in at least the vertical direction.

7. The angle or position detecting method as set forth in claim 5,
   wherein the operational amplifying means is a zero cross comparator.

8. The angle or position detecting method as set forth in claim 5,
   wherein the operational amplifying means is a zero cross comparator.

9. A servo apparatus, comprising:
   an actuator composed of a coil and a magnet;
   a mechanism for performing a rotating operation or a reciprocal operation;
   a sensor for detecting the angle or position of the actuator and outputting a first sine wave and a second sine wave that are shifted by 90 degrees each other;
   a counter for storing the current angle or the current position;
   a memory for outputting a third sine wave and a fourth sine wave that are shifted by 90 degrees each other corresponding to an output of the counter;
   a first multiplying device for multiplying the first sine wave by the third sine wave;
   a second multiplying device for multiplying the second sine wave by the fourth sine wave;
   a subtracting device for subtracting a signal that is output from the first multiplying device from a signal that is output from the second multiplying device;
   operation amplifying means for amplifying a signal that is output from the subtracting device;
   model acceleration curve generating means for generating acceleration/deceleration pulses composed of an acceleration and a deceleration;
   model velocity curve generating means for generating a velocity data sequence that is obtained by integrating the acceleration/deceleration pulses;

model position curve generating means for generating a position data sequence that is obtained by integrating the velocity data sequence;

means for increasing/decreasing the current angle or current position of the counter corresponding to an output of the operational amplifying means and outputting the increased or decreased angle or position as the current angle or current position;

position error extracting means for extracting a position error from the current angle or current position and the position data sequence;

velocity error extracting means for extracting a velocity error from the current velocity data and the velocity data sequence, the current velocity data being obtained by differentiating the current angle or current velocity; and feedback loop means for adding the position error and the velocity error, amplifying the added data, and feeding back the amplified data to a driver for driving the actuator, wherein a servo operation of the servo apparatus is performed so that while the servo apparatus is being accelerated or decelerated, the position and the velocity of the servo apparatus do not deviate from a preset position curve and a preset velocity curve.

10. The servo apparatus as set forth in claim 9, wherein the mechanism for performing the rotating operation or reciprocal operation has:
an optical axis varying device for varying the direction of an optical axis in at least the vertical direction.

11. The servo apparatus as set forth in claim 9, wherein the operational amplifying means is a zero cross comparator.

12. The servo apparatus as set forth in claim 10, wherein the operational amplifying means is a zero cross comparator.

13. A servo method, comprising the steps of:

causing an actuator composed of a coil and a magnet to perform a rotating operation or a reciprocal operation;

detecting the angle or position of the actuator and outputting a first sine wave and a second sine wave that are shifted by 90 degrees each other;

storing the current angle or the current position;

outputting a third sine wave and a fourth sine wave that are shifted by 90 degrees each other corresponding to the current angle or current position that has been stored;

causing a first multiplying device to multiply the first sine wave by the third sine wave;

causing a second multiplying device to multiply the second sine wave by the fourth sine wave;

causing a subtracting device to subtract a signal that is output from the first multiplying device from a signal that is output from the second multiplying device;

causing operation amplifying means to amplify a signal that is output from the subtracting device;

generating acceleration/deceleration pulses composed of an acceleration and a deceleration;

generating a velocity data sequence that is obtained by integrating the acceleration/deceleration pulses;

generating a position data sequence that is obtained by integrating the velocity data sequence;

increasing/decreasing the current angle or current position of the counter corresponding to an output of the operational amplifying means and outputting the increased or decreased angle or position as the current angle or current position;

extracting a position error from the current angle or current position and the position data sequence;

extracting a velocity error from the current velocity data and the velocity data sequence, the current velocity data being obtained by differentiating the current angle or current velocity; and forming a feedback loop means for adding the position error and the velocity error, amplifying the added data, and feeding back the amplified data to a driver for driving the actuator, wherein a servo operation is performed so that while accelerated or decelerated, the position and the velocity do not deviate from a preset position curve and a preset velocity curve.

14. The servo method as set forth in claim 13, wherein the mechanism for performing the rotating operation or reciprocal operation has:
an optical axis varying device for varying the direction of an optical axis in at least the vertical direction.

15. The servo method as set forth in claim 13, wherein the operational amplifying means is a zero cross comparator.

16. The servo method as set forth in claim 14, wherein the operational amplifying means is a zero cross comparator.

* * * * *